United States Patent
Menon et al.

(10) Patent No.: US 12,488,293 B2
(45) Date of Patent: Dec. 2, 2025

(54) MANAGING FACILITY AND PRODUCTION OPERATIONS ACROSS ENTERPRISE OPERATIONS TO ACHIEVE SUSTAINABILITY GOALS

(71) Applicant: Schlumberger Technology Corporation, Sugar Land, TX (US)

(72) Inventors: Shashi Menon, Houston, TX (US); Hemant Arora, Houston, TX (US); David Seabrook, London (GB); Gian-Marcio Gey, London (GB); Hans Eric Klumpen, Houston, TX (US); Debasish Das, Houston, TX (US); Federico Sporleder, Pune (IN); Jing Zhang, Houston, TX (US); Rajarshi Ray, London (GB); Nader Salman, Houston, TX (US); Stephanie Lee, Houston, TX (US); Colin Wier, Houston, TX (US); Neeraj Kamat, Pune (IN); Harshada Modak, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/733,939

(22) Filed: Jun. 5, 2024

(65) Prior Publication Data
US 2024/0403777 A1    Dec. 5, 2024

Related U.S. Application Data

(60) Provisional application No. 63/471,174, filed on Jun. 5, 2023.

(51) Int. Cl.
*G06Q 10/06* (2023.01)
*G06Q 10/063* (2023.01)
(Continued)

(52) U.S. Cl.
CPC ..... *G06Q 10/063* (2013.01); *G06Q 10/06315* (2013.01); *G06Q 10/0633* (2013.01);
(Continued)

(58) Field of Classification Search
CPC ....... G06Q 10/06375; G06Q 10/06315; G06Q 10/067
See application file for complete search history.

(56) References Cited

U.S. PATENT DOCUMENTS

| 7,584,165 B2 | 9/2009 | Buchan |
| 8,112,300 B2 | 2/2012 | Harper |

(Continued)

FOREIGN PATENT DOCUMENTS

| CN | 110110904 | | 8/2019 |
| CN | 113969774 | * | 1/2022 |

(Continued)

OTHER PUBLICATIONS

A. Farajzadeh, R., et al. "Life-cycle production optimization of hydrocarbon fields: thermoeconomics perspective." Sustainable Energy & Fuels 3.11 (2019): 3050-3060. (Year: 2019).*

(Continued)

*Primary Examiner* — Hamzeh Obaid
(74) *Attorney, Agent, or Firm* — Michael Guthrie

(57) ABSTRACT

A method may include receiving production data and facility data associated with an enterprise, such that the production data includes operational tasks performed in a hydrocarbon production system, and the facility data includes one or more utility operations within one or more buildings associated with the enterprise. The method may also include receiving sustainability parameter data associated with one or more operations corresponding to the enterprise based on the production data and the facility data, generating a sustainability report representative of sustainability parameters (Continued)

associated with the operations of the enterprise based on the sustainability parameter data, and sending the sustainability report to one or more engineering workflow systems to determine action plans associated with improving the sustainability parameters. After receiving the action plans, the method includes sending commands to cause devices to adjust their respective operations.

20 Claims, 11 Drawing Sheets

(51) Int. Cl.
    *G06Q 10/0631*      (2023.01)
    *G06Q 10/0633*      (2023.01)
    *G06Q 10/0637*      (2023.01)
    *G06Q 10/0639*      (2023.01)
    *G06Q 10/067*      (2023.01)
    *G06Q 50/02*      (2012.01)

(52) U.S. Cl.
    CPC ..... *G06Q 10/0637* (2013.01); *G06Q 10/0639* (2013.01); *G06Q 10/067* (2013.01); *G06Q 50/02* (2013.01)

(56) References Cited

U.S. PATENT DOCUMENTS

| | | |
|---|---|---|
| 10,339,478 B2 | 7/2019 | Grant |
| 10,373,085 B1 | 8/2019 | Baghdikian |
| 12,028,274 B1 | 7/2024 | Krishnaiah et al. |
| 2007/0078692 A1 | 4/2007 | Vyas |
| 2008/0077371 A1 | 3/2008 | Yeten |
| 2011/0061295 A1 | 3/2011 | McAlister |
| 2011/0320054 A1* | 12/2011 | Brzezowski ........... G06Q 50/06 700/291 |
| 2012/0271669 A1 | 10/2012 | Taper |
| 2013/0098049 A1 | 4/2013 | Kraemer et al. |
| 2016/0350778 A1 | 12/2016 | Levine et al. |
| 2017/0051681 A1 | 2/2017 | Arias Chao |
| 2017/0097616 A1 | 4/2017 | Cozad et al. |
| 2017/0321656 A1 | 11/2017 | Eisenberger |
| 2018/0231967 A1 | 8/2018 | Cohen |
| 2018/0266241 A1* | 9/2018 | Ferguson ............... E21B 44/00 |
| 2019/0257544 A1 | 8/2019 | Alanqar et al. |
| 2019/0335674 A1 | 11/2019 | Basso |
| 2019/0340709 A1 | 11/2019 | Elbsat et al. |
| 2019/0370690 A1 | 12/2019 | Anderson |
| 2019/0385244 A1 | 12/2019 | Stelmar Netto |
| 2021/0200169 A1 | 7/2021 | Ploegert et al. |
| 2021/0238971 A1 | 8/2021 | Crumpton |
| 2021/0372864 A1 | 12/2021 | Tao et al. |
| 2021/0388717 A1 | 12/2021 | Srinivasan |
| 2022/0027810 A1 | 1/2022 | Murthy |
| 2022/0044336 A1 | 2/2022 | Whikehart |
| 2022/0065834 A1 | 3/2022 | Gadot et al. |
| 2022/0076182 A1 | 3/2022 | Vollmert et al. |
| 2022/0230250 A1 | 7/2022 | Kawamori |
| 2022/0243570 A1* | 8/2022 | Xiao .................... F04D 13/0673 |
| 2022/0284519 A1 | 9/2022 | Pancholi et al. |
| 2022/0290554 A1 | 9/2022 | Al Saad |
| 2022/0325887 A1 | 10/2022 | Wang et al. |
| 2022/0343229 A1 | 10/2022 | Gruber |
| 2022/0343433 A1 | 10/2022 | Yan |
| 2022/0404050 A1 | 12/2022 | Chang et al. |
| 2023/0070672 A1 | 3/2023 | Yarkony |
| 2023/0075128 A1 | 3/2023 | Yarkony |
| 2023/0077807 A1 | 3/2023 | Chidambaram et al. |
| 2023/0085641 A1* | 3/2023 | Jones .................... G05B 15/02 700/275 |
| 2023/0152763 A1* | 5/2023 | Davis .................... G05B 15/02 700/275 |
| 2023/0193791 A1 | 6/2023 | Katterbauer |
| 2023/0222388 A1 | 7/2023 | Cella |
| 2023/0325606 A1 | 10/2023 | Mahendravarman et al. |
| 2023/0350387 A1 | 11/2023 | Davis et al. |
| 2023/0351300 A1* | 11/2023 | Nielsen .............. G06Q 10/0637 |
| 2023/0385299 A1 | 11/2023 | Al Rasheed et al. |
| 2024/0067884 A1 | 2/2024 | Rooney et al. |
| 2024/0281826 A1* | 8/2024 | Mallet .................. G06Q 30/018 |
| 2024/0328303 A1 | 10/2024 | Arukhe |
| 2024/0403765 A1 | 12/2024 | Menon |
| 2024/0403778 A1 | 12/2024 | Menon |
| 2024/0403782 A1 | 12/2024 | Menon |
| 2024/0403784 A1 | 12/2024 | Menon |
| 2024/0403791 A1 | 12/2024 | Menon |
| 2024/0403893 A1 | 12/2024 | Menon |

FOREIGN PATENT DOCUMENTS

| | | |
|---|---|---|
| CN | 114565319 | 5/2022 |
| CN | 115563757 | 1/2023 |
| KR | 10-1993366 | 9/2019 |
| WO | 2009152553 | 12/2009 |
| WO | 2016196351 | 8/2016 |
| WO | 2020263693 | 12/2020 |
| WO | 2023009865 | 2/2023 |
| WO | 2023017164 | 2/2023 |
| WO | 2023033832 | 3/2023 |
| WO | WO-2023154091 A1 * | 8/2023 .......... G06F 11/3062 |

OTHER PUBLICATIONS

Farsan et al., "Value Change in the Value Chain: Best Practices in Scope 3 Greenhouse Gas Management", Climate-KIC, Version 3.0, Nov. 2018. (Year: 2018), 44 pages.

Non-Final Office Action issued in U.S. Appl. No. 18/733,951 on Aug. 8, 2024; 19 pages.

Non-Final Office Action issued in U.S. Appl. No. 18/734,079 on Aug. 27, 2024; 28 pages.

Non-Final Office Action issued in U.S. Appl. No. 18/733,942 on Aug. 13, 2024; 15 pages.

Wikipedia, "Internet of Things", https://en.wikipedia.org/wiki/Internet_of_things; accessed Aug. 8, 2024, 5 pages. (Year: 2022).

International Search Report and Written Opinion issued in International Patent Application No. PCT/US2024/032503 on Sep. 13, 2024; 12 pages.

International Search Report and Written Opinion issued in International Patent Appl. No. PCT/US2024/032506 on Sep. 11, 2024, 10 pages.

International Search Report and Written Opinion issued in International Patent Appl. No. PCT/US2024/032490 on Sep. 27, 2024, 13 pages.

International Search Report and Written Opinion issued in International Patent Appl. No. PCT/US2024/032483 on Sep. 27, 2024, 9 pages.

Non-Final Office Action issued in U.S. Appl. No. 18/734,238 on Sep. 24, 2024; 29 pages.

International Search Report and Written Opinion issued in International Patent Appl. No. PCT/US2024/032475 on Sep. 30, 2024, 10 pages.

International Search Report and Written Opinion issued in International Patent Appl. No. PCT/US2024/032499 on Sep. 19, 2024; 13 pages.

International Search Report and Written Opinion issued in International Patent Appl. No. PCT/US2024/032492 on Sep. 27, 2024; 13 pages.

Sipola, J. et al., "Adopting artificial intelligence in sustainable business", Journal of Cleaner Production, 2023, 426, 8 pages.

\* cited by examiner

MANAGING FACILITY AND PRODUCTION OPERATIONS ACROSS ENTERPRISE OPERATIONS TO ACHIEVE SUSTAINABILITY GOALS

CROSS-REFERENCE TO RELATED APPLICATIONS

This application claims priority to U.S. Provisional Application No. 63/471,174, filed Jun. 5, 2023, and entitled "SUSTAINABILITY PLATFORM FOR IMPROVING SUSTAINABILITY PARAMETERS ACROSS ENTERPRISE OPERATIONS," which is incorporated by reference herein in its entirety.

This application is related to U.S. Ser. No. 18/734,079, filed Jun. 5, 2024 entitled, "UPDATING SUSTAINABILITY ACTION PLANS FOR AN ENTERPRISE BASED ON DETECTED CHANGE IN INPUT DATA"; U.S. Ser. No. 18/734,238 filed Jun. 5, 2024 entitled, "OPTIMIZING SUSTAINABILITY PARAMETERS WITH ACTION PLANS FOR AN ENTERPRISE"; U.S. Ser. No. 18/733,951, filed Jun. 5, 2024 entitled, "PREDICTING SUSTAINABILITY ACTION PLAN PERFORMANCE OVER TIME"; and U.S. Ser. No. 18/734,289, filed Jun. 5, 2024, entitled, "UPDATING SUSTAINABILITY ACTION PLANS BASED ON THIRD PARTY DATA", each of which is incorporated herein by reference.

BACKGROUND

This disclosure relates generally to providing plans, workflows, and recommendations for improving sustainability parameters across enterprise operations.

As hydrocarbons are extracted from hydrocarbon reservoirs via hydrocarbon wells in oil and/or gas fields, the extracted hydrocarbons may be transported to various types of equipment, tanks, processing facilities, and the like via transport vehicles, a network of pipelines, and the like. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

The transported hydrocarbons may be processed or refined into suitable hydrocarbon products and ultimately distributed to end consumers. Overall, the hydrocarbon enterprise may be characterized as encompassing upstream, midstream, and downstream stages. At each of these stages, sustainability parameters such as energy, carbon, waste, water, and the like may be consumed or used. As enterprises move towards becoming more sustainable organizations, it may be challenging to track sustainability parameters while simultaneously identifying opportunities for improving sustainability parameters associated with the enterprise.

This section is intended to introduce the reader to various aspects of art that may be related to various aspects of the present techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, a method may include receiving production data and facility data associated with an enterprise, such that the production data includes operational tasks performed in a hydrocarbon production system, and the facility data includes one or more utility operations within one or more buildings associated with the enterprise. The method may also include receiving sustainability parameter data associated with one or more operations corresponding to the enterprise based on the production data and the facility data, generating a sustainability report representative of sustainability parameters associated with the operations of the enterprise based on the sustainability parameter data, and sending the sustainability report to one or more engineering workflow systems to determine action plans associated with improving the sustainability parameters. After receiving the action plans, the method includes sending commands to cause devices to adjust their respective operations.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the embodiments described herein are intended to apply mutatis mutandis as optional features of every other aspect of the invention to which those consistory clauses could possibly relate.

BRIEF DESCRIPTION OF THE DRAWINGS

Various Features, Aspects, and Advantages of this Disclosure Will Become Better Understood when the Following Detailed Description is Read with Reference to the Accompanying Figures in which Like Characters Represent Like Parts Throughout the Figures, Wherein.

DETAILED DESCRIPTION

Figure 1:
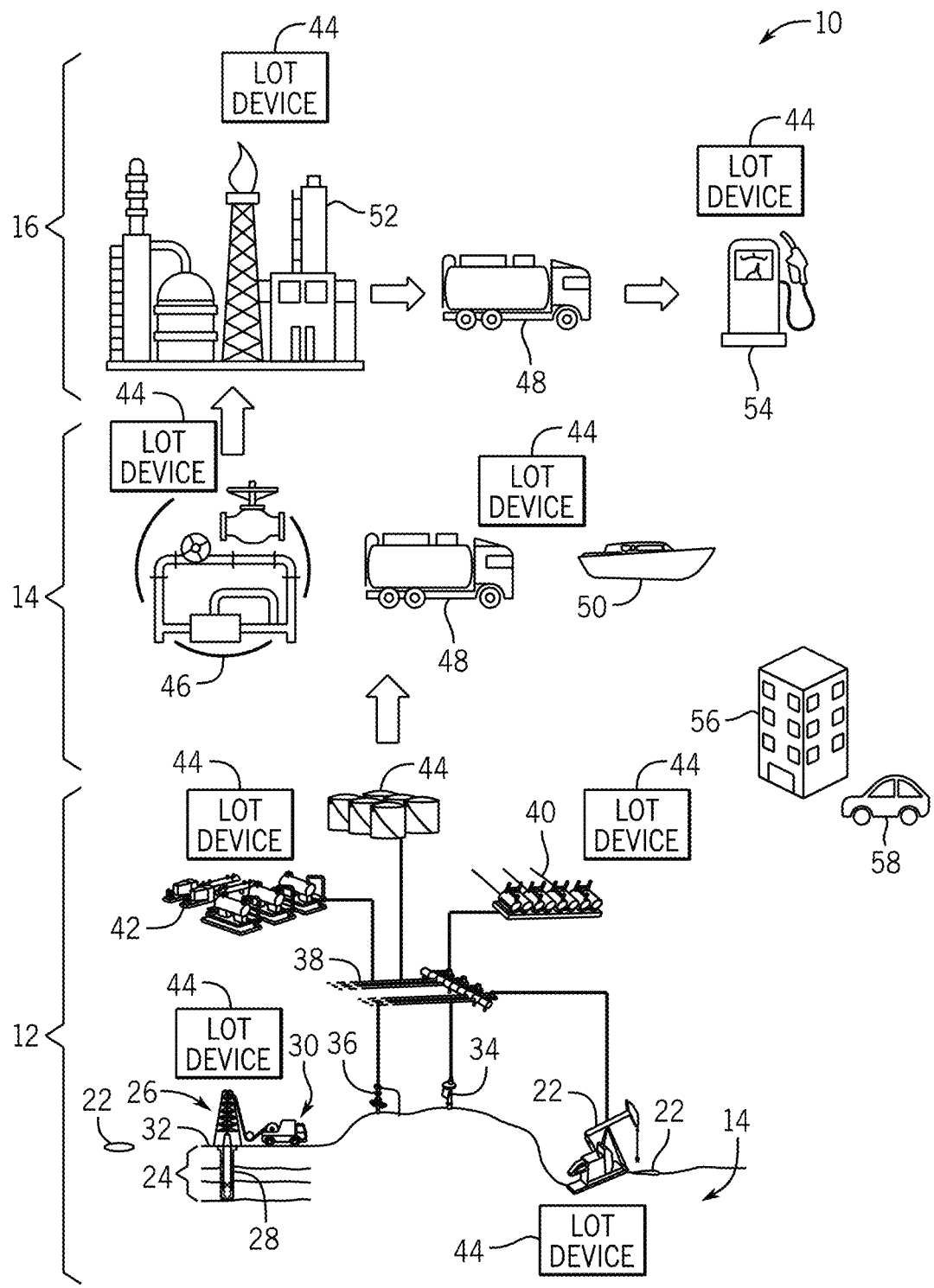
FIG. 1 illustrates a schematic diagram of example hydrocarbon production system that may include operations undertaken by an enterprise to produce, process, and distribute hydrocarbon products, according to one or more embodiments of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of this disclosure, the articles "a," "an," and "the" are intended to mean that there are one or more of the elements. The terms "including" and "having" are used in an open-ended fashion, and thus should be interpreted to mean "including, but not limited to . . . " Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Hydrocarbon sites may include a number of components that facilitates the extraction, processing, and distribution of hydrocarbons (e.g., oil) from a well or well site. A hydrocarbon extraction site may include different types of facilities and equipment including extraction tools, pipelines, and the like. The operations related to the extraction of the hydrocarbons may often be referred to as upstream operations. After the hydrocarbons are extracted, the raw hydrocarbons may be transported via automobile vehicles, railways, barges, pipelines, or any suitable component to storage containers, processing centers, and the like. In some cases, the raw hydrocarbons may be treated (e.g., waste removal, compressed) prior to being transported to other facilities. These operations are often referred to as midstream operations. Finally, the hydrocarbons may be processed (e.g., refined) and distributed to end consumers, thereby covering downstream operations.

At each stage of operations, a certain amount of greenhouse gas emissions may be produced when performing various tasks associated with each stage. As industries move to providing a net zero carbon enterprise, the greenhouse gas emissions produced during these stages should be removed from the atmosphere. A number of action plans may be related to removing carbon from the atmosphere including afforestation, reforestation, soil carbon sequestration, carbon capture and storage technology, direct air capture technology, ocean fertilization, reducing emissions at the source, switching to sustainable power sources, reusing previously discarded resources, and the like. In addition to net zero carbon operations, industries are working to achieve improved sustainability parameters that reduce waste, conserve resources, and reduce the effects that their respective operations have on the environment.

In order to prepare action plans to achieve net zero operations, organizations may first determine baseline sustainability variable values (e.g., carbon, waste, water) that reflect the current operations of the entire organization or enterprise. That is, the organization may employ a sustainability platform system to collect data related to sustainability parameters from across the entire organization. By way of example, hydrocarbon enterprises may include a number of operations related to the manufacturing, processing, or production of hydrocarbon products. Indeed, hydrocarbon enterprises may involve operations related to upstream, midstream, and downstream operations. As such, to determine the baseline sustainability parameters, the sustainability platform system may collect data from sensors, forecasting models, reports, internet-of-things (IoT) devices, image data (e.g., optical gas imaging), flaring control measurements, and other suitable data sources. Using the collected data over time, the sustainability platform system may determine baseline sustainability parameters (e.g., carbon footprint, waste levels, water usage) for the entire operational flow of the enterprise over a period of time (e.g., days, weeks, months, years).

Based on the macro-outlook of future sustainability goals as provided by a user, the sustainability platform system may then employ a planning module to determine action plans to determine a number of sustainability operations to employ to cause the baseline sustainability parameters to trend towards net zero operations. The planning operations employed by the sustainability platform system may involve reviewing digital models, empirical models, or insights received from previous operations at facilities other than the respective enterprise to determine operational changes to operations performed within the enterprise, additional operations (e.g., install carbon capture technology) to add to the enterprise, and other suitable action plans to cause the enterprise operations to improve sustainability parameters.

The action plans may thus be related to facility level operations that optimize sustainability efficiencies at a facility level that may involve modifying certain processes (e.g., order or time to perform performing tasks based on sustainable energy source schedule) to optimize sustainability efficiencies. The facilities of an enterprise may be related to buildings in which engineers and office personnel visit, as well as structures that support industrial operations such as refining operations. By evaluating the sustainability parameters with respect to the facility level, the sustainability platform system may provide action plans to coordinate facility operations (e.g., work from home days, lighting operations, operational task schedules) to improve sustainability efficiencies.

In addition, enterprises may perform certain operations to produce or manufacture a product. The sustainability platform system may also evaluate these product level operations to identify different processes, equipment, or devices to use to improve sustainability parameters related to the operations that correspond to the operations involved in producing or manufacturing a product. By way of example, a Product carbon footprint (PCF) may be generated based on the techniques described herein to illustrate a total greenhouse emission generated by a product over the different stages of its life cycle. For instance, a cradle-to-grave PCF may include greenhouse emissions from operations related to extraction of raw materials to operations related to the end-of-life of the product.

With the foregoing in mind, the sustainability platform system may measure the sustainability parameters for the enterprise at various levels, provide reports related to the measured values, and verify the measurements to ensure that a developed action plan, when implemented, may improve sustainability efficiencies within the enterprise operations. It should be noted that the measured sustainability parameters may also be sourced or estimated as provided by certain data sources, such as emissions databases provided by EPA, IEA, and the like. In some embodiments, the sustainability platform system may collect the measured and verified data to provide reports for meeting certain governmental reporting regulations. Further, the sustainability platform system may model the determined action plans to predict the effects to the measured sustainability parameters over a period of time to determine whether the sustainability parameters will achieve desired values or ranges.

After generating the action plan, the enterprise operations may implement the outlined actions of the action plan by adjusting the operations of facilities, the operations of the production services, or the like. As the action plan takes effect, the sustainability platform system may continue to measure, validate, and report the sustainability parameters that were previously collected to perform feedback analysis to determine the effectiveness of the action plan. The results may be stored in a database or other suitable storage component to serve as empirical data for assist other enterprise achieve their sustainability goals. Further, the feedback may be provided to the models used to generate the action plans to better calibrate certain machine learning parameters or coefficients, such that the models may more accurately reflect the actual measurements.

With the foregoing in mind, the present embodiments described herein provide a computationally efficient manner to monitor, track, project, and adjust sustainability parameters associated with operations throughout an enterprise. Indeed, some systems use integrated workflows that become prohibitively expensive with respect to cost and computational processing power by determining recommendations for achieving improved sustainability parameters without incorporating feedback mechanisms, real-time data sources, and updated projections, as described herein. By continuously tracking and updating the sustainability action plans generated for an enterprise based on input data changes detected in real time, the present embodiments may incrementally update portions of a sustainability model without independently regenerating the respective sustainability model for the enterprise. In this way, operation personnel of the enterprise may be notified in a timely manner to adjust operations for ensuring that certain sustainability target goals are achieved over a period of time as circumstances changes.

Unlike other sustainability evaluation processes, which may be prohibitively slow with exhaustive sustainability parameters to account for, the present embodiments provide a more efficient analysis that reduces the amount of processing power employed by computing systems tasked to determine the recommended sustainability action plans by employing action plan modules or systems that focus on specific sustainability parameter improvements. In other words, other optimization schemes are limited by certain memory and computational parameters of existing computing systems to provide useful facilities recommendations for hydrocarbon site planning operations. However, by processing of different datasets modularly (e.g., set portions), the present embodiments described herein may allow for the ability to trade computer processing time/resources for precision of the optimal solution.

It should be noted that although the following description of various embodiments for improving sustainability parameters is described with respect to hydrocarbon enterprise operations, it should be understood that the embodiments described herein may be applied to any suitable industry including utilities, cementing operations, steel factories, and the like. Further, although the following description of the various methodologies may be detailed in the context of a particular industry or technology area, it should be noted that the methodologies described herein may be implemented within other suitable areas.

By way of introduction, FIG. 1 illustrates a schematic diagram of an example hydrocarbon production system 10 where hydrocarbon products, such as crude oil and natural gas, may be extracted from the ground, stored, transported, processed, distributed, and the like. The example hydrocarbon production system 10 is provided as an example enterprise that includes a number of different units that coordinate with each other to perform various tasks. For instance, the enterprise may include a collection of equipment, buildings, personnel, raw materials, office buildings, and other components that encompass at least some aspect of the business operations of the enterprise. In the example hydrocarbon production system 10 described below, the enterprise includes all of the processes, employees, operations, buildings, equipment, and other related components that enable the enterprise to produce, transport, and distribute hydrocarbon products. In the same way, the present embodiments described herein may be applied to other enterprises that provide other products and services and should not be limited the hydrocarbon production system 10 described below.

Referring now to FIG. 1, the hydrocarbon production system 10 may generally include an upstream system 12, a midstream system 14, and a downstream system 16. The upstream system 12 may include a number of components and equipment associated with the exploration and production of hydrocarbons. As such, geological surveys that employ seismic sources (e.g., vibrators, air guns), seismic sensors, and other equipment (e.g., fracking trucks) used for hydrocarbon exploration services may be included in the upstream system 12, although not illustrated in FIG. 1.

In addition, the upstream system 12 may include a number of components or facilities that correspond to wells, processing facilities, collection components, distribution networks, and the like. For example, as shown in FIG. 1, the upstream system 12 may include a number of wells 22 disposed within a geological formation 24. The wells 22 may include drilling platform 26 that may have performed a drilling operation (e.g., on land or subsea) to drill out a wellbore 28. Additionally, as used herein, wells 22 may generally refer to physical components such as the drilling platform 26 and wellbore 28 and/or the general area of the reservoir in which extraction is desired (e.g., a reservoir well section). The drilling operations may include drilling the wellbore 28, injecting drilling fluids into the wellbore 28, performing casing operations within the wellbore 28, exploratory operations measuring the viability of the wellbore 28, extraction operations, and the like. In addition to including the drilling platform 26, the upstream system 12 may include surface equipment 30 that may carry out certain operations, such as cement installation operation, well logging operations to detect conditions of the wellbore 28, and the like. As such, the surface equipment 30 may include equipment that store cement slurries, drilling fluids, displacement fluids, spacer fluids, chemical wash fluids, and the like. The surface equipment 30 may include piping and other materials used to transport the various fluids described above into the wellbore 28. The surface equipment 30 may also include pumps and other equipment (e.g., batch mixers, centrifugal pumps, liquid additive metering systems, tanks, etc.) that may be used with or part of the interior of a casing string with the fluids discussed above.

In addition to the equipment used for drilling operations, the upstream system 12 may include a number of well devices that may control the flow of hydrocarbons being extracted from the wells 22. For instance, the well devices in the upstream system 12 may include pumpjacks 32, submersible pumps 34, well trees 36, and the like. The pumpjacks 32 may mechanically lift hydrocarbons (e.g., oil) out of the well 22 when a bottom hole pressure of the well 22 is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The submersible pump 34 may include electro-submersible pumps (ESPs) that may be submerged in a wellbore and may user an electric motor to drive impellers to lift fluid to the surface. As such, ESPs may be an energy-intensive tool that may have a significant impact in sustainability factors. With this in mind, the environmental impact, particularly in terms of emissions, may largely depend on the source of power or energy provided to the ESP and its sustainability properties (e.g., cleanliness). If the ESPs are powered by renewable energy, the ESPs' emission footprint can be minimized. However, reliance on fossil fuels for power or energy can result in significant carbon emissions. As such, to improve sustainability parameters, ESPs may be integrated with sustainable energy sources to mitigate environmental impact.

The well trees 36 may be an assembly of valves, spools, and fittings used for natural flowing wells. As such, the well trees 36 may be used for an oil well, gas well, water injection well, water disposal well, gas injection well, condensate well, and the like. By way of reference, the wells 22 may be part of a first hierarchical level and the well devices that extract hydrocarbons from the wells 22 may be part of a second hierarchical level above the first hierarchical level.

After the hydrocarbons are extracted from the surface via the well devices, the extracted hydrocarbons may be distributed to other devices via a network of pipelines 38. That is, the well devices of the upstream system 12 may be connected together via a network of pipelines 38. In addition to the well devices described above, the network of pipelines 38 may be connected to other collecting or gathering components, such as wellhead distribution manifolds 40, separators 42, storage tanks 44, and the like.

In some embodiments, the pumpjacks 32, the submersible pumps 34, well trees 36, wellhead distribution manifolds 40, separators 42, and storage tanks 43 may be connected together via the network of pipelines 38. The wellhead distribution manifolds 40 may collect the hydrocarbons that may have been extracted by the pumpjacks 32, the submersible pumps 34, and the well trees 36, such that the collected hydrocarbons may be routed to various hydrocarbon processing or storage areas in the upstream system 12, the midstream system 14, or the downstream system 16. The separator 42 may include a pressure vessel that may separate well fluids produced from oil and gas wells into separate gas and liquid components. For example, the separator 42 may separate hydrocarbons extracted by the pumpjacks 32, the submersible pumps 34, or the well trees 36 into oil components, gas components, and water components. After the hydrocarbons have been separated, each separated component may be stored in a particular storage tank 43. The hydrocarbons stored in the storage tanks 43 may be transported via the pipelines 38 to transport vehicles, refineries, and the like.

In addition to the components described above, internet-of-things (IoT) devices 46 may be distributed throughout the upstream system 12, the midstream system 14, and the downstream system 16 and may collect information, perform analysis on data, send data related to a respective component or parameters (e.g., temperature, flow) of a component to a computing system or the like. By way of example, the IoT device may include sensors, actuators, machines, or other equipment that may include a processor that execute computer instructions and performs certain tasks including collecting data, processing data, and communicating data over a network.

Although the hydrocarbon production system 10 is described above with certain components, it should be understood that the hydrocarbon production system 10 may include additional, fewer, or different components. For example, although discussed above in relation to the hydrocarbon production system 10 on land, present embodiments may also apply to offshore hydrocarbon sites, hydraulic fracturing or fracking operations, hydraulic fracturing or fracking operations, and the like.

After extracting, transporting, and storing the hydrocarbons in the upstream system 12, the hydrocarbons may be transported and stored in the midstream system 14. The midstream system 14 may thus include pipeline infrastructure 46 that may move the extracted hydrocarbons across certain terrains and geographic locations to facilities to process, refine, or store the hydrocarbons. The pipeline infrastructure 46 may include similar devices as described in the upstream system 12 such as the separators 42 and storage tanks 43, as well as other components that may assist in moving the hydrocarbons long distances, such as pumping stations, tank trucks 48, rail tank cars, barges 50, and the like. The IoT devices 44 may thus track the flow of the hydrocarbons, the valves for directing the hydrocarbons within the pipelines, the locations of the vehicles used to transport the hydrocarbons, and the like. In some embodiments, the IoT devices 44 may include autonomous control systems to control the operations of the vehicles transporting the hydrocarbons.

The downstream system 16 may include components that may convert the transported hydrocarbons into final petroleum or gas products. The operations performed by the downstream system 16 may include refining the hydrocarbons into different products such as gasoline, diesel, oils, lubricants, petrochemicals, and the like. As such, the downstream system 16 may include a refinery system 52 for processing the hydrocarbons. By way of example, the refinery system 52 may include distillation towers to separate the hydrocarbons, heat exchangers to transfer heat between different fluids, pumps used to move fluids, reactors to perform chemical reactions for processing the hydrocarbons, separators 42, compressors, storage tanks, and the like. After the hydrocarbons are converted into hydrocarbon products, they may be transported to other locations for distribution via tank trucks 48 or other suitable distribution mechanisms. For instance, the hydrocarbon products (e.g., gasoline) may be distributed to a fuel station to distribute fuel to consumers via a gas pump 54.

In addition to the upstream system 12, the midstream system 14, and the downstream system 16, the enterprise may include buildings 56, vehicles 58, and other objects that are owned, leased, or operated by an organization. These tangential or supplemental objects may be involved in the planning, marketing, accounting, and supplementary business aspects for commercializing the hydrocarbon production system 10. Although only the buildings 56 and vehicles 58 are depicted as supplementary objects associated with the enterprise in FIG. 1, it should be understood that other supplementary objects may also be considered part of the enterprise.

Each of the components and subsystems of enterprise described above (e.g., the upstream system 12, the midstream system 14, the downstream system 16, office building 56) involves the consumption of resources such as energy and water. Further, these systems also produce a certain amount of waste greenhouse gas (GHG) emissions while performing their respective operations. The resource, waste, and emission amounts vary for different portions of each respective system, but the aggregated resource, waste, and emission amounts may include a planning phase (e.g., within building 56), a construction phase, an operation phase, a decommissioning phase, and the like. In addition, each of these phases at each system level (e.g., upstream, midstream, downstream, office) produces greenhouse gas (GHG) emissions such as carbon dioxide, methane, and the like. The resources, waste, GHG emissions, and other byproducts consumed and produced during these operations may be referred to as sustainability parameters.

Enterprises may generally move to improve sustainability parameters by focusing on one or more of increasing energy efficiencies, reducing water usage, curbing GHG emissions, decreasing waste amounts, and the like. The sustainability parameters may be interdependent with each other, and the enterprise may reduce the environmental impacts of their operations by coordinating their operations to improve the aggregate sustainability parameters across the enterprise. As shown in FIG. 1, any type of enterprise may involve a diverse group of equipment, processes, structures, and the like. In accordance with the embodiments described herein, a sustainability platform system may track and monitor sustainability parameters across the variety of levels, operations, and aspects of the enterprise to provide sustainability action plans to revise enterprise operations and structures to improve sustainability parameters. Indeed, as more industries move to achieve net zero compliance in which the enterprise achieves a balance between the amount of GHG emissions produced by the enterprise operations and removed from the atmosphere, efficient generation of efficient action plans for reduced GHG emissions and other sustainability operations may be increasingly important.

Keeping this in mind, the present embodiments described herein may include systems and methods for improving sustainability operations across enterprise operations. For example, a data flow diagram 70 of operations performed by a sustainability platform system 70 is presented in FIG. 2. The data flow diagram 70 may use inputs from data sources to generate sustainability action plans to adjust operations and/or procedures within an enterprise to improve sustainability parameters. Although the data flow diagram 70 illustrates a set of input data sources 74, a methodology 76, and a set of engineering workflow systems 78, it should be noted that the elements illustrated in FIG. 2 do not constitute an exhaustive list of elements that may be part of the data flow diagram 70 and used to perform the methods described herein. Instead, the depicted elements are merely provided as examples to provide context and to supplement the explanation of the embodiments described herein.

Figure 2:
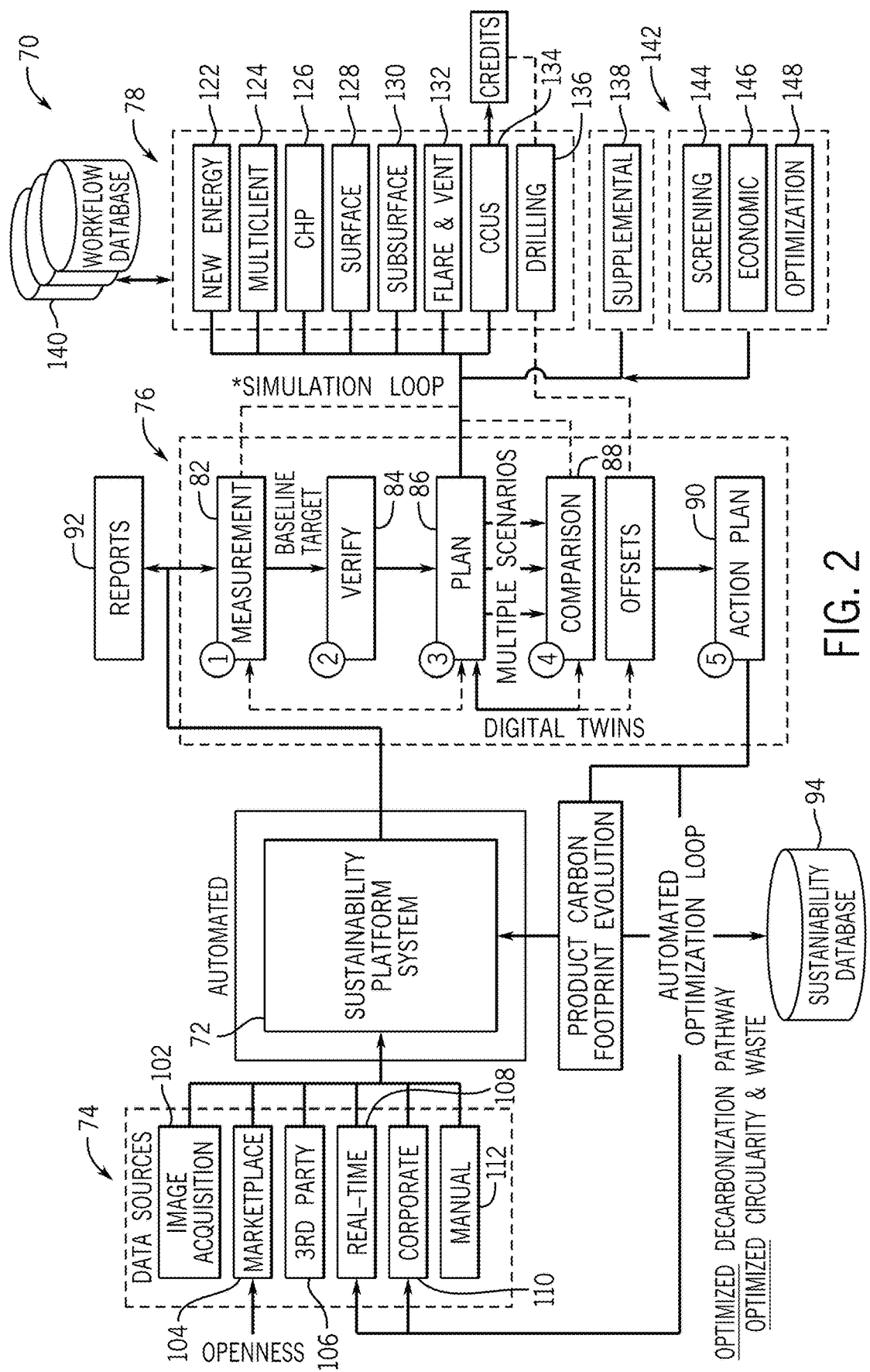
FIG. 2 is a data flow diagram in which inputs from data sources are used to generate workflow plans to adjust operations and/or procedures within an enterprise to improve sustainability parameters, according to one or more embodiments of this disclosure.

Referring now to FIG. 2, the sustainability platform system 72 may include any suitable computing device, cloud-computing device, edge computing device, or the like and may include various components to perform various analysis operations. By way of operation, the sustainability platform system 72 may receive input data regarding measured sustainability parameters, policies for sustainability programs, and other information from a set of input data sources 74. Based on the input data, the sustainability platform system 72 may perform certain calculations, analyses, or operations to track sustainability parameters across enterprise operations, report the sustainability parameters with respect to legislative policies or regulations, identify relationships between operational parameters for facilities, devices, and other components that are part of the enterprise and the measured sustainability parameters, and the like.

In some embodiments, the sustainability platform system 72 may implement the methodology 76 that may include a measurement block 82, a verification block 84, a planning block 86, and a comparison block 88. After receiving input data, analyzing the input data with respect to the engineering workflow systems 78, the sustainability platform system 72 may generate one or more action plans 90 that may detail operational changes for facilities, machinery, and the like. After the action plans 90 are put in place within the enterprise operations, the sustainability platform system 72 may again receive the input data to determine the effectiveness of the action plans 90, provide improved action plans 90, and continuously improve the sustainability parameters across the enterprise operations for the life of the enterprise.

Generally, the measurement block 82 may receive the input data and store the related measurements, values, and other measurable parameters in a storage component, data store, or the like. In some embodiments, the measurement block 82 may prepare or organize the measurement data in accordance with specific protocols or formats, as defined by reports 92. The reports 92 may include previous reports prepared for different authorities or organizations. As such, the reports 92 may also include metadata related to the format, structure, and type of information presented in the reports 92. In some embodiments, the reports 92, the metadata regarding the reports 92, instructions regarding the preparation or formatting of the reports 92 may also be stored in a database or data storage for access by the sustainability platform system 72.

The measurement data recorded by the measurement block 82 may be validated by the verification block 84. That is, the verification block 84 may analyze or query other input data to verify that the recorded measurement data is accurate. For example, the measurement block 82 may receive a measurement from the IoT device 44 regarding some sustainability parameter, such as energy consumption. The verification block 84 may retrieve corporate energy invoices to determine whether the energy consumption measured by the IoT device 44 corresponds to the energy consumed according to the utility providing the energy.

The planning block 86 may use the verified measurement data to query the engineering workflow systems 78 to generate one or more potential action plans or scenarios for improving the sustainability parameters. The engineering workflow systems 78 may include a number of distinct modules or systems that provide recommendations (e.g., equipment recommendation, operational change recommendation) for various portions of the enterprise to improve distinct aspects of sustainability or gain insight to better determine a plan for improving sustainability parameters across the enterprise. For instance, the engineering workflow systems 78 may include a new energy system that tracks new energy sources that may be used to meet the energy requests of various portions of the enterprise. The new energy sources may include renewable energy sources to improve the sustainability parameters for the enterprise operations. As such, the new energy system may determine whether alternative energy sources can be used to replace energy sources that may be less sustainable.

After generating a number of potential plans or scenarios, the comparison block 88 may analyze the collection of potential plans to determine whether plans could be combined, provide comparison data for different sustainability parameters associated with the generated plans, and the like. Additionally, in some embodiments, an offset block 89 may augment the potential plans to form an action plan 90. For example, carbon credits 91 (e.g., purchased or created via carbon capture) may be factored into the comparison and evaluation of potential plans to achieve goals of an action plan 90. The comparison data may be presented to a user via an electronic display or any suitable display technology. In some embodiments, the plans or comparison data may be sent to user devices (e.g., mobile phone) and may cause the user devices to automatically open or execute an application associated with the sustainability platform system 72, such that the user device presents visualization related to the determined plans, the comparison data, or the like. In some embodiments, the visualizations may be selectable input fields in which the user may touch or select via an input device (e.g., keyboard, mouse). After receiving a selection that corresponds to the action plan 90, the sustainability platform system 72 may send the action plan 90 to other user devices, a sustainability database 94, or other suitable recipient, such that the enterprise may make changes to its operations to implement the recommendations outlined in the action plan 90. In some embodiments, the sustainability platform system 72 may send commands to equipment (e.g., lights, pumps, wellheads, artificial lifts), such as via IoT devices 44, to adjust operations based on the recommended action plan 90 to improve the sustainability parameters associated with the enterprise.

Referring now to the input data sources 74, in some embodiments, the sustainability platform system 72 may receive data from image acquisition sources 102, marketplace sources 104, third party sources 106, real-time sources 108, corporate sources 110, manual sources 112, and the like. The image acquisition sources 102 may include devices that may acquire image data (e.g., pictures, video, infrared image) using any suitable image sensor. As such, the devices may include satellites, drones, infrared sensors, cameras, and the like. The image data provided by the image acquisition sources 102 may correspond to heat dissipating from a device, gas leaking from a device, emissions (e.g., fumes, height of fumes) produced by a device, or any other suitable image data that may provide information related to any suitable sustainability parameter. In some embodiments, the sustainability platform system 72 may determine an approximate amount of emissions based on the image data. Although the determined amount may not be precise, the measurement block 82 may use the initial estimate as a data point and use other data points to verify via the verification block 84 using other data.

The marketplace sources 104 may include data provided by analysis software, crowdsourcing systems, and other data sources that may be facilitated by a marketplace such as the Ocean Store provided by Schlumberger and other like sources. That is, the marketplace sources 104 may include data provider sources or services that capture, generate, or simulate certain datasets (e.g., emissions, waste, water usage, energy consumption) for use by the sustainability platform system 14 as ready-made data. For instance, emissions data may be provided by certain marketplace sources 104 that may be able to broadcast or present their available data services for integration with the sustainability platform system 14 via an integration tool, a network location, the sustainability platform system 14 itself, or the like. The supplied data (e.g., emissions data) may be incorporated for calculation purposes, analysis purposes, simulation purposes, or the like. Indeed, the data provided via the marketplace sources 104 may include emission factors from various sources such as IPCC, IEA, EIA, and the like, as well as publicly available frameworks such as TCFD, GHG protocol, and the like. In some cases, the marketplace sources 104 may provide data services for a fee (e.g., subscription) and may coordinate data exchange via the sustainability platform system 72 to enhance the data analysis operations while employing solutions provided by the engineering workflow systems 78 and the like.

As such, different insights with regard to the received data may be determined or gleaned by the sustainability platform system 72 based on the software modules or solutions provided via the marketplace sources 104. In addition to the examples provided above, the marketplace sources 104 may provide virtual metering data to provide an estimated flow amount for a pump. That is, an application or tool may be provided by the marketplace sources 104 that uses an efficiency of the pump to determine a virtual amount of flow of fluids via the pump based on the amount of time that the pump was operating. Although the present disclosure describes certain exemplary services that may be received via the marketplace sources 104, it should be understood that the marketplace sources 104 may be provided by any suitable application, data system, or other component that may interact and exchange information with the sustainability platform system 72.

The third-party sources 106 may include supplier information provided by a manufacturer or other entity regarding a device, system, facility, or the like. Using the pump example mentioned above, the third-party sources 106 may provide a datasheet or operational data that details the efficiency, energy consumption rate, and other information related to the operation of the pump. In addition, third-party sources 106 may correspond to data sources that may be utilized by the sustainability platform system 72 to perform various operations via the planning block 86, in coordination with the engineering workflow systems 78, and the like. By way of example, the third-party sources 106 may include data service providers that perform independent research and business intelligence analysis such as Rystad, Gartner, Statista, and the like. In addition, data projections for different organizations may be provided via the marketplace sources 104 as these organizations acquire these data projections (e.g., OPEX/CAPEX) such as historical emission figures, geographies of areas for operation, number of present facilities, number of fields, and the like. Although the present disclosure describes certain exemplary services that may be received via the third-party sources 106, it should be understood that the third-party sources 106 may be provided by any suitable application, data system, or other component that may interact and exchange information with the sustainability platform system 72.

The real-time sources 108 may include data provided by sensors, devices, and other data sources via a network connection. As such, the real-time sources 108 may include the IoT devices 44, as well as any smart component that may be part of the enterprise. In addition, the real-time sources 108 may include routers and other data collection point devices that may receive data (e.g., sensor data) from other systems, computing devices, instruments, and the like.

The corporate sources 110 may include data provided by corporate entities associated with the enterprise or other organization. For instance, many enterprises may use enterprise resource planning (ERP) software systems to assist in coordinating and tracking business operations such as finance, human resources, field operations, manufacturing, production, supply chain, procurement, customer service, and any other suitable business operation. The corporate sources may also include memorandums, company earnings reports, sustainability reports, and other publications provided by the enterprise that may describe various operations, goals, and finances associated with the enterprise. In some embodiments, the corporate sources 110 may provide an ERP report that details employees that work in a facility, the addresses associated with the employees, the schedules of the employees, the salary information for the employees, the utility invoices for the buildings accessed by the employees, and the like. This information may enable the sustainability platform system 72 to measure emissions related to the enterprise operations to generate insights regarding priorities to address. Further, the information may be used to provide action plans 90 at a facility level, such as recommending changes to work schedules that may encourage work from home days to offset sustainability liabilities in different parts of the enterprise.

With this in mind, the action plans 90 may include providing recommendations to improve energy efficiency measure within the building 56 by installing energy-efficient lighting systems, employing sensors that adjust lighting based on occupancy, upgrading or controlling HVAC systems, and the like. In addition, the building 56 may integrate renewable energy sources such as solar panels, wind farms, and the like, in addition to purchasing renewable energy credits or the like. In some embodiments, the action plans 90 may include adjusting light operations, HVAC operations, or both within the building 56.

In the same manner, the action plans 90 may include implementing water-saving fixtures (e.g., faucets, toilets) to conserve water resources. Moreover, rainwater may be harvested using landscaping irrigation, water storage components, and the like. In addition, water irrigation operations for landscaping surrounding the building 56 may be adjusted based on the sustainability parameters and embodiments described herein.

Additionally, as mentioned above, work schedules may be modified to modify employee office visits to reduce the carbon emissions related to commuting to the office. Further, large capacity transportation vehicles may be commissioned by the enterprise to employ high-occupancy vehicles that travel to employees' homes in a particular area to commute the employees to and from the building 56. As such, the action plans 90 may involve coordinating with ride-share services and other applications to facilitate the commutes. That is, the action plans 90 may engage (e.g., send requests) computing devices or servers for ride share applications to coordinate pick up of employees that are co-located within a same area or location (e.g., based on receiving location data from user devices) during a time period.

The manual sources 112 may include any data manually provide to the sustainability platform system 72 via user input or the like. For instance, the sustainability platform system 72 may provide a user interface that solicits inputs from a user regarding various parts of the enterprise operations. The user input may be provided to the sustainability platform system 72 and used for generating the action plans 90 via the methodology 76.

Referring now to the engineering workflow systems 78, the sustainability platform system 72 may employ one or more of the engineering workflow systems 78, independently or in combination with one or more other systems, to determine recommendations for changing enterprise operations. As used herein, enterprise operations may include any building, operation, task, or activity related to the products and services produced by the enterprise. As such, for example, the enterprise may include any of the activities related to those described above with respect to the hydrocarbon production system 10 from the upstream system 72 to operations related to the function of the building 56. In this way, the sustainability platform system 72 may holistically evaluate an overall sustainability for the enterprise operations and determine effective and creative solutions to achieve net zero goals.

Each of the engineering workflow systems 78 may perform specific analysis operations to determine solutions for the respective technology areas. That is, the engineering workflow systems 78 may assist with the designing and monitoring of abatement solutions (e.g., emission abatement, waste abatement, etc.). As such, each engineering workflow system 78 may include a separate computing device, cloud system, or the like that independently analyzes data and produces outputs. Each engineering workflow system 78 may thus send queries for information or data to the sustainability platform system 72, which may serve as data intermediary to assist each engineering workflow system 78 in retrieving relevant information to allow the respective engineering workflow system 78 to perform its analysis. In the same manner, the sustainability platform system 72 may query one or more engineering workflow systems 78 to retrieve solutions, analysis, recommendations, or the like to determine action plans to improve sustainability parameters. Although the following discussion of the types of the engineering workflow systems 78 include a certain number of systems, it should be noted that additional systems may also be part of the engineering workflow systems 78.

As shown in FIG. 2, the engineering workflow systems 78 may include a new energy system 122, a multiclient system 124, a combined heat and power (CHP) system 126, a surface system 128, a subsurface system 130, a flare and vent system 132, a carbon capture system 134, a drilling system 136, and a supplemental system 138. As mentioned above, each of the engineering workflow systems 78 may coordinate operations with the sustainability platform system 72 to perform the methodology 76 and generate action plans 90. However, by using different modules or systems to analyze different aspects of engineering, the present embodiments described herein enable the sustainability platform system 72 to preserve computing resources for coordination and integration operations (e.g., collection and transmission of data, organizing plans, coordinating feasibility of different plans for enterprise) between the input data sources 74 and the engineering workflow systems 78 without analyzing different engineering solutions for sustainability improvements. It should be noted that each of the engineering workflow systems 78 may be complex systems that operate on their own respective platforms (e.g., processing systems, storage components, network connections) to perform various types of data analysis, operations, simulations, and the like. In addition, the output data provided by these engineering workflow systems 78 or used by the same may be stored for use by various entities in workflow databases 140 or other suitable storage component.

By way of example, the new energy system 122 may track, monitor, simulate, and design solutions for various industries to achieve more sustainable energy goals. The new energy system 122 may receive invoice data for energy costs associated with the enterprise (e.g., corporate data source 110), real-time energy usage from IoT devices (e.g., real-time data sources 108), and other relevant data regarding the energy consumption data for various aspects of the enterprise. The energy consumption data may include utility provider information that indicates the source of the energy (e.g., coal, renewable), a rate schedule for the provided utilities, and the like. The new energy system 122 may also include databases or storage components that include models that represent other enterprise or facility operations, simulated models generated by artificial intelligence (e.g., neural networks, pattern analysis), machine learning algorithms, or the like. The models or lookup tables may provide information related to the amount of energy provided to different enterprises, the type of energy provided to these enterprises, the costs associated with commissioning these energy sources, and the like. For instance, the new energy system 12 may model the ability of wind farms and solar panel fields to provide energy for one or more facets of a particular enterprise. Alternative sources may also include renewable energy options such as solar power, wind power, hydroelectric power, hydrogen, geothermal energy, biomass, and other suitable alternative energy sources. The model may also include cost projections for commissioning these energy sources, as well as projections over the life of the enterprise. These models may be employed by the sustainability platform system 72 to determine action plans to apply to its respective input data related to the respective enterprise and identify action plans 90 that may assist in improving energy sustainability parameters for the enterprise. In addition to providing alternative energy sources, the new energy system 122 may also provide recommendations with regard to storing energy in batteries, storing hydrogen for later use, storing geothermal energy for use, and the like.

The combined heat and power (CHP) system 126 may perform analysis to determine methods for reusing emissions such as carbon dioxide to increase efficiency. For instance, heat can be recaptured during a portion of a process and the heat can be applied to a heat exchanger to produce energy or perform some other function using the heat recaptured from performing another process within the enterprise. As such, the CHP system 126 may request image data and infrastructure or design data for facilities of the enterprise from the sustainability platform system 72 to identify process components that may produce heat or power that may be recaptured and recycled for other functions within the enterprise. In any case, the CHP system 126 may help the sustainability platform system 72 determine action plans 90 that improve energy efficiency and reduce facility carbon emissions.

The multiclient system 124 may include data analysis systems from other sources. Indeed, these sources may provide information related to the operations of the enterprise that may be gleaned from the input data received by the sustainability platform system 72 but may not be determined by the sustainability platform system 72.

The surface system 128 may include computing systems and databases of information that details operational data regarding various types of equipment that may be installed on the surface of the hydrocarbon production system 10. As such, the surface system 128 may continuously update its data sources to track updated versions of components, identify replacement parts and products for components, track efficiency improvements of components, monitor recalls or issues with installed components, and the like. The surface system 128, for example, may receive real-time data via the sustainability platform system 72 and determine that certain pieces of equipment are operating inefficiently, are reaching an end of life, has a more energy efficient counterpart available, or the like. The sustainability platform system 72 may coordinate with the surface system 128 to identify replacements, new components to add to the enterprise, and the like to improve the sustainability parameters of the enterprise operations.

In the same manner, the subsurface system 130 may include computing systems and databases of information regarding equipment that may be part of subsurface operations in the hydrocarbon production system 10. As such, the subsurface system 130 may provide recommendations with regard to improved data acquisition processes, techniques, equipment, and the like that may enable the enterprise to improve sustainability parameters. By way of example, the subsurface system 130 may determine improved seismic data acquisition techniques that consume less energy as compared to previous techniques using existing equipment in the enterprise.

The flare and vent system 132 may provide recommendations with regard to flaring and venting excess emissions. In some embodiments, the excess emissions may be captured using carbon capture technology. As such, the flare and vent system 132 may coordinate with the carbon capture (CCUS) system 134 to determine carbon capture technology for storing captured carbon. The CCUS system 134 may provide data regarding costs, installation profile, and operations for carbon technology and recommendations with regard to injecting the captured carbon into appropriate locations. In some embodiments, captured carbon may not be useful for a particular enterprise but may be useful for other enterprises. As such, the CCUS system 134 may identify the industries or organizations that may use the captured carbon in an efficient manner.

The drilling system 136 may provide recommendations with regard to drilling operations for creating boreholes, wells, and the like. The drilling operations may include equipment information, slurry makeup, drilling fluids, water conservation operations, and the like. Further, the supplemental system 138 may include recommendations for other industries, suppliers, distributors, or consumers associated with the enterprise. For instance, the supplemental system 138 may include gasoline distribution facilities with gas pumps 54 that provide gasoline to consumers. The supplemental system 138 may provide information with regard to improving sustainability parameters for operations that occur between the enterprise associated with the sustainability platform system 72 and the organization operating the gasoline distribution facilities.

In addition to the engineering workflow systems 78, strategy level planning systems 142 may interact with the sustainability platform system 72 to perform strategic planning operations for determining sustainability action plans 90, performing screening analysis, determining economic aspects of the action plans 90, determining optimization functions for the action plans 90, and the like. That is, the strategy level planning systems 142 may evaluate an organization's sustainability operations at various hierarchical levels to perform some strategic planning for certain operations, such as performing decarbonization operations. By way of example, the strategy level planning systems 142 may include screening systems 144, economic systems 146, optimization systems 148, and other systems that may analyze the feasibility and viability of implementing certain sustainability action plans 90.

With this in mind, the strategy level planning systems 142 may perform materiality assessment to provide the enterprise with an opportunity to analyze risks and opportunities associated with implementing the action plans 90, and to make any adjustments necessary to improve its business strategy. The assessment helps the organization understand where it is creating or reducing value for society and represents a comprehensive business case to senior executives about why and how to report ESG (environmental, social, governance) data and manage ESG performance. The information obtained and tracked on the platform may essentially help companies in this decision-making process towards their decarbonization strategy. With clear visibility across all 3 scopes (e.g., environmental, social, governance), materiality assessment would be facilitated. In this way, the strategy level planning system 142 may enable the sustainability platform system 72 to review action plans 90 with respect to government variable, risk management variable, target metrics, and the like.

In some embodiments, the strategy level planning systems 142 may perform evaluation operations based on organizational boundaries and operational boundaries. Organizational boundaries may determine operations that are operated and owned or controlled by the enterprise and thus are included in inventory analysis. The organizational boundaries may account for emissions according to an equity share in the enterprise associated with the respective operations (e.g., equity share approach) or with respect to the aspects of the enterprise that the enterprise may control (e.g., control approach). By way of example, the control approach may include financial control or operational control.

Operational boundaries determine which operations and sources generate emissions, associate sources for emissions, and explanations with regard to how the sources are classified. In some cases, the operational boundaries may attribute emissions as direct emissions and indirect emissions. With this in mind, certain organizations evaluate sustainability by tracking their emissions effectively as direct emission and indirect emissions. This tracking may help the sustainability platform system 72 understand hotspots for the enterprise and subsequently develop carbon footprint reduction plans and subsequent business strategy/future investment. In this way, the sustainability platform system 72 may help companies across a wide range of solutions in the hard-to-abate industries starting from measuring emissions to verifying and reporting. Subsequently, the sustainability platform system 72 may help them in their decarbonization pathway through the engineering capabilities accessible via the platform as described herein.

In some embodiments, the screening system 144 may perform some technical analysis with respect to overall or high-level system perspectives to determine a relative effectiveness of implementing or conducting sustainability improvement operations on the enterprise. The screening system 144 may then use the high-level analysis to coordinate with other engineering workflow systems 78 to determine suitable action plans 90 that may be beneficial for the enterprise.

In the same manner, the economic system 146 may provide economic or financial data related to the operational costs of the enterprise, economic considerations for improving sustainability parameters for the enterprise, and the like. In this way, the economic system 146 may provide some insight into economic cost benefits for implementing certain action plans 90. In addition, the economic system 146 may coordinate with engineering workflow systems 78 to assess costs for performing certain tasks and/or for determining the economic feasibility of certain action plans 90.

The optimization system 148 may determine or analyze optimization parameters for performing certain action plans 90. For instance, the optimization system 148 may determine optimization parameters for reducing cost per carbon in decarbonization plans. In any case, the strategy level planning systems 142 may assist the sustainability platform system 72 to perform economic analysis to perform operations, such as selecting action plans 90, engaging engineering workflow systems 78, selecting input data sources 74, and the like when determining or implementing action plans 90 or performing other suitable operations.

By coordinating the various components described in FIG. 2 and throughout the application, the sustainability platform system 72 may provide a seamless integration and understanding with ESG scoring and reporting tools, which are designed to assess and measure the sustainability and societal impact of companies and investments. As such, the sustainability platform system 72 may help organizations evaluate their performance in key ESG areas and provide transparent reporting to stakeholders.

Further, it should be noted that although the embodiments described herein are detailed with respect to existing enterprise operations, in some embodiments, the sustainability platform system 72 may be used in earlier phases of business development such as field development planning. That is, field development planning may include facility and infrastructure planning operations for building new facilities in various industries. The sustainability platform system 72 and the methods described herein may be incorporated into the field planning operations to account for sustainability parameters in the field development plans.

It should be noted that the sustainability platform system 72 illustrated and described above with respect to FIG. 2 corresponds to one embodiment in which the sustainability platform system 72 may be implemented. However, the sustainability platform system 72 may also be implemented in accordance with other structures. For instance, the engineering workflow systems 78 may be part of the sustainability platform system 72 as a layer for performing analysis operations. The sustainability platform system 72 may also include other layers of operations such as digital foundation services, data infrastructure, and the like. Additional details with regard to the sustainability platform system 72, providers for the sustainability platform system 72, and consumers of the sustainability platform system 72 will be discussed below with reference to FIGS. 3-5. It should be noted while certain aspects of FIG. 2 are shown as individual elements for data flow purposes, there may or may not be a physical, logical, and/or computational distinction therebetween. For example, in some embodiments, the sustainability platform system 72 may be considered as distinct from or to include the at least a portion of the engineering workflow systems 78, at least a portion of the sustainability database 94, at least a portion of the workflow database 140, and/or at least a portion of the input data sources 74.

Figure 3:
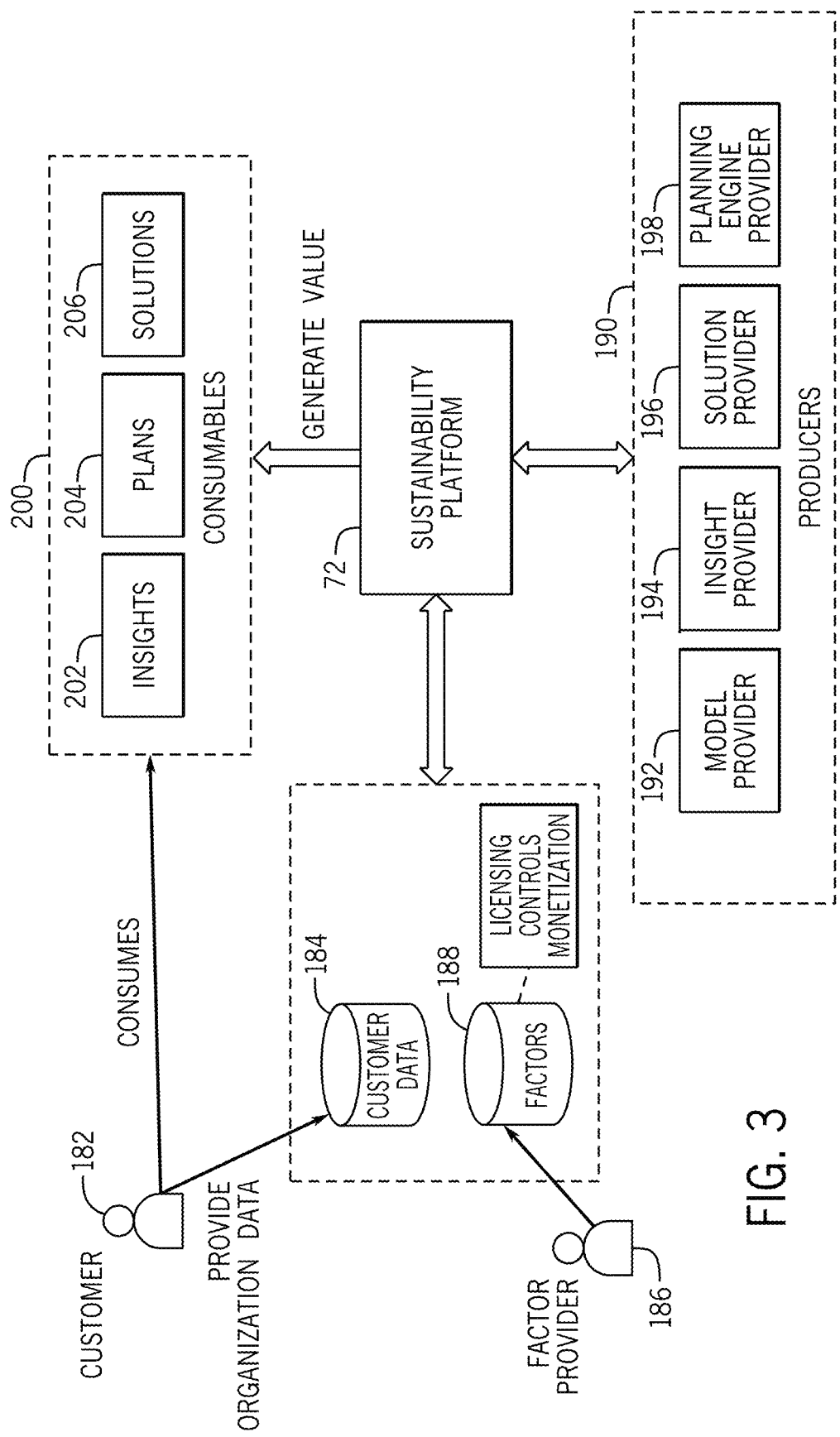
FIG. 3 illustrates a block diagram illustrating interactions between various entities and the sustainability platform system, according to one or more embodiments of this disclosure.

Keeping the foregoing in mind, FIG. 3 illustrates example interactions between various entities with respect to the sustainability platform system 72. For instance, customer 182 may provide organization data (e.g., ERP data, manual input data), which may be stored in a customer database 184. The organization data may provide insight into the organization of the enterprise, the enterprise operations, or the like. In the same manner, a factor provider 186 may provide factor data related to various factors, variables, and other information that may be related to the enterprise operations. The factor data may be stored in a factor database 188 or other suitable storage component. The factor data and the customer data may be provided via the data sources 72, as described above, or other suitable sources.

The sustainability platform system 72 may interact with the data accessible via the customer database 184 and the factor database 188 to coordinate with producers 190. The producers 190 may provide solutions for various types of analysis similar to the operations described above with respect to the engineering workflow systems 78, the strategy planning system 142, and the like. By way of example, the producers 190 may include a model provider 192, an insight provider 194, a solution provider 196, and a planning engine provider 198. The model provider 192 may provide model data for performing the techniques described above, the insight provider 194 may glean insights from the data sources provided to the sustainability platform system, the solution provider 196 may determine action plans 90 to implement to improve specific sustainability parameters, and the planning engine provider 198 may determine coordination action plans to implement across various parts of the enterprise to facilitate the implementation of multiple action plans 90.

Based on the information received from the customer database 184, the factors database 188, and the producers 190, the sustainability platform system 72 may generate value by providing consumables 200 for the customer 182 to use to improve sustainability parameters for the respective enterprise. Indeed, the consumables 200 may include insights 202 that provide information related to sustainability parameters and correlations to certain parts of the enterprise operations, plans 204 (e.g., action plans 90) that may enable the sustainability parameters to improve, and solutions 204 for achieving particular sustainability goals.

Figure 4:
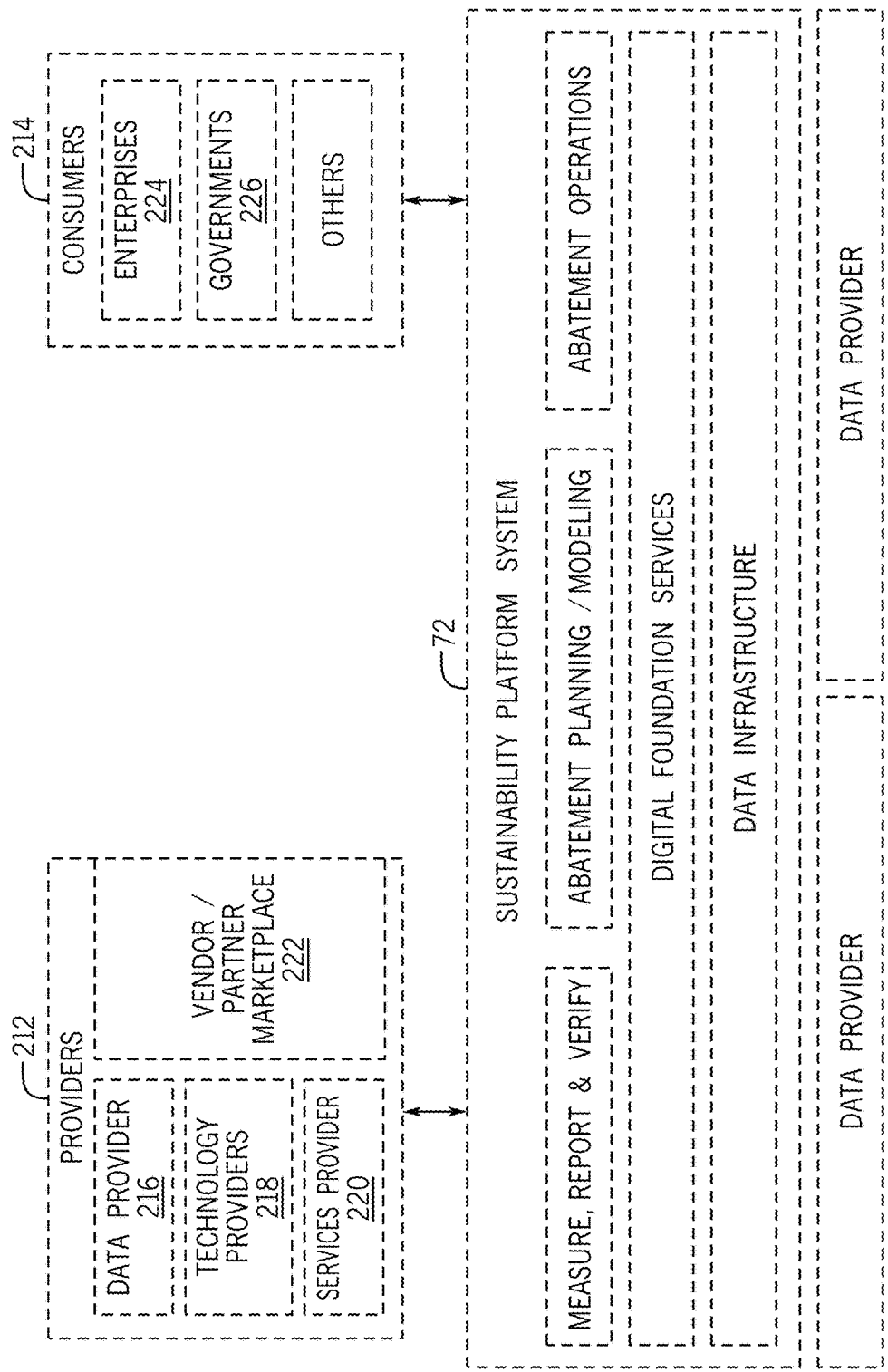
FIG. 4 illustrates a block diagram illustrating interactions between providers, consumers, and the sustainability platform system, according to one or more embodiments of this disclosure.
Figure 5:
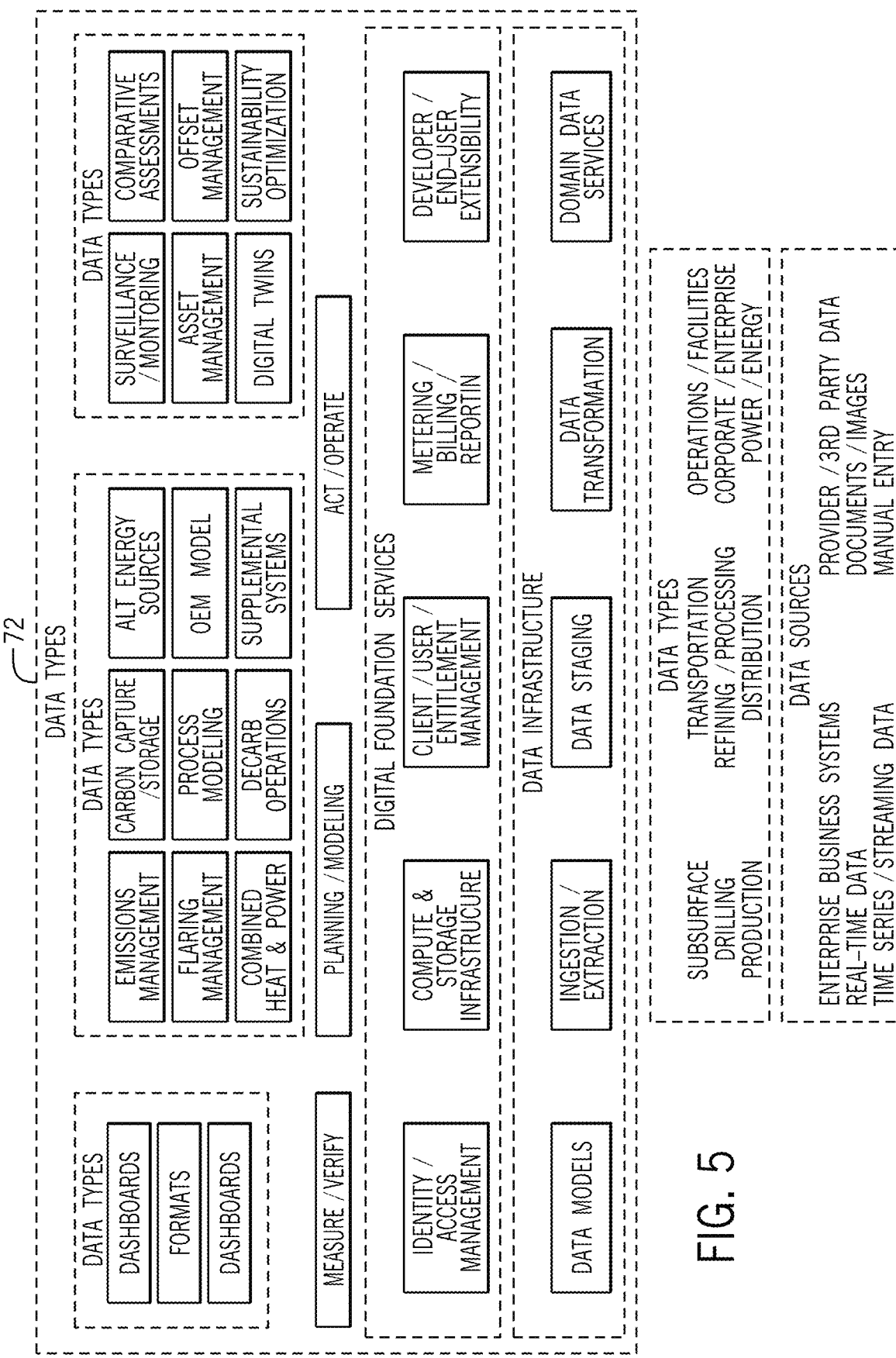
FIG. 5 illustrates a detailed view of the sustainability platform system, according to one or more embodiments of this disclosure.
Figure 6:
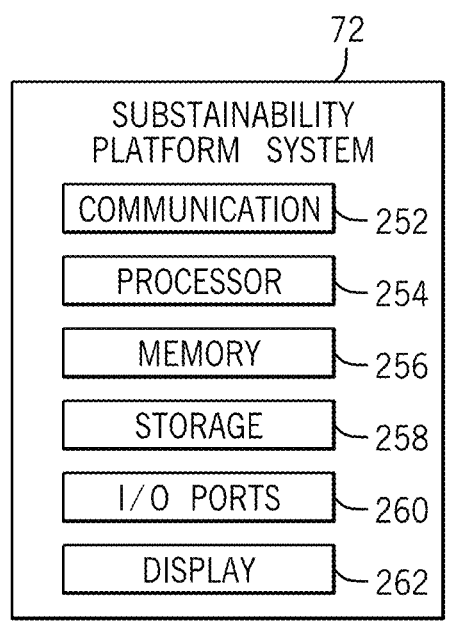
FIG. 6 is a block diagram of components that may be part of the sustainability platform system, according to one or more embodiments of this disclosure.

Keeping this in mind, FIG. 4 illustrates a more detailed view of the producers 190 as providers 212 and the customers 182 as consumers 214. The providers 212 may include any type of provider that may provide information, services, technology, or other tool or data that may enable the sustainability platform system 72 to perform the methods described above. Indeed, the providers 212 may include data providers 216 that collect and send various types of sustainability parameter data, enterprise data, or other suitable data for performing various tasks described herein. In this way, data vendors may be accessible to the sustainability platform system 72. In addition, customer data, service company data, and other types of data become available for the sustainability platform system 72.

In addition, the providers 212 may include technology providers 218 that may provide products or assets that may enable the sustainability platform system 72 to update or replace technology in the enterprise to achieve sustainability goals. In the same manner, services providers 220 may provide services for improving enterprise operations to achieve sustainability goals.

The data providers 216 may thus include data sources such as internal data sources, third party data sources, industry data sources, public data sources, government data sources, and the like. The data provided the data sources may be of data types such as structured, unstructured, at rest, real-time, streaming, and the like. The data providers 216 may include customer, data vendors, public sources, and the like. The data providers 216 may also include domain workflow systems (e.g., engineering workflow systems 78) such as emissions management systems, flaring management systems, CHP, carbon capture/transport/storage system, power source (e.g., electrification, hydrogen, etc.) systems, decarbonization wellsite/field activities/services systems, and the like. Further, the data providers 216 may provide data relevant for various industries such as oil and gas industries, power and utility industries, industrials industries, and the like.

By way of example, the data providers 216 may include different vendors that publish data related to different types of data. For instance, sustainability data vendors may provide sustainability data that characterize expected sustainability parameters related to the use of certain equipment or the like. In the same manner, industrial data vendors may provide data related to sustainability parameters for different types of industries (e.g., oil/gas, manufacturing, mining).

Public data vendors may track data related to municipalities or government regulations that may affect sustainability goals or action plans 90 that may be implemented. Although the data providers 216 are described as including the sustainability data vendors, the industrial data vendors, and the public data vendors, the data providers 216 should not be limited to these example providers. Indeed, the data providers 216 include any suitable data provider to assist in the embodiments described herein.

The technology provider 218 may include various types of technologies including simulation modeling, artificial intelligence (AI) modeling, machine learning (ML) modeling, product carbon footprint (PCF) calculators, and the like. The simulation modeling may include computing systems that predict or generate expected sustainability parameters for the continued operations of the respective enterprise. In addition, the AI/ML modeling technologies may employ AI/ML algorithms to simulate operations over time based on training datasets related to other equipment operated over time. The PCF calculators may be used to determine carbon footprint expectations for products and services provided by the enterprise. Although the technology providers 218 are described as including the simulation modeling, the AI/ML modeling, and the PCF calculators, the technology providers 218 should not be limited to these example providers. Indeed, the technology providers 218 include any suitable technology provider to assist in the embodiments described herein.

The services providers 220 may include various types of parties and/or entities that provide services to assist in the implementation and operations of the sustainability platform system 72. As such, the services providers 220 may include measurement services that simulate or measure variables that are produced in the field. Monitoring, reporting, and verification (MRV) services may also be part of the services providers 220. The MRV services may implement a process for measuring sustainability parameters (e.g., GHG emissions) output by the enterprise operations. In addition, the services providers 220 may include abatement services that provide information and/or solutions (e.g., equipment) for abating or reducing the negative sustainability parameters to improve the overall sustainability of the enterprise operations. Although the services providers 220 are described as including measurement services, the MRV services, and the abatement services, the services providers 220 should not be limited to these example providers. Indeed, the data providers 216 include any suitable data provider to assist in the embodiments described herein.

Referring back to FIG. 4, in addition to the data providers 212 described above, a vendor/partner marketplace 222 may provide a digital or network location for other providers to present various technologies, data, or other solutions to the sustainability platform system 72. Indeed, the participants of the vendor/partner marketplace 222 may provide unique solutions or insights to specific challenges.

Although the present embodiments described herein have detailed the consumers 214 to include enterprises 224, the consumer 214 may also include governments 226 and others. That is, enterprises 224 may include any type of organizational entity that performs various types of operations for producing products or providing services. For example, the enterprises 624 may include oil and gas enterprises, mining enterprise, power production enterprises, and the like. The governments 226 include regulatory organizations and national governments that track, monitor, and enforce sustainability goals to different enterprises. As such, the sustainability platform system 72 may provide insights and reports to track national sustainability parameters for all enterprises operating within the respective nation.

With this in mind, the consumers 214 may include customers of different persona, regulatory entities (e.g., few personas; not in-depth consumption; reporting, dashboards, scenarios, etc.), government entities (e.g., lightweight consumption-mostly outcomes from platform like reporting), and the general public. As such, the sustainability platform system 72 supports a multi-tenet structure to be flexible to provide solutions and insights applicable to different organizations, scopes, or goals. Indeed, in addition to oil and gas operations (e.g., Hydrocarbon extraction, transport, processing, distribution), the consumers 214 may include carbon-heavy power/utilities industries (e.g., thermal, coal, natural gas) and carbon-heavy industrials (e.g., cement, iron/steel).

By way of example, the consumers 214 may include enterprises, governments, and the like. As such, the enterprises may include oil/gas, power/utilities, cement/steel/industrial, and any other suitable enterprise operations. Governments may include regulatory entities, reporting entities, sustainability entities, and other types of entities that may be commissioned or part of a governmental entity. In addition, the consumers 214 may include international entities (e.g., United Nations), MRV services, abatement services, and the like.

Referring again back to FIG. 4, the sustainability platform system 72 may perform various analysis operations to determine action plans 90 using measure, report, and verify operational workflows. In addition, the sustainability platform system 72 may provide abatement planning and modeling workflows, as well as abatement operations. To facilitate each of these operations, the sustainability platform system 72 may include digital foundation services and data infrastructure that may allow the sustainability platform system 72 to discover the providers 212, the workflow systems, and other components that may be available for the sustainability platform system 72 to use to generate the consumables 200. In addition, the digital foundation services may provide data ingestion and transformation operations to process and transform datasets into processable data. In this way, the sustainability platform system 72 may provide domain specific aggregation of datasets for processing or use by other workflows or analysis. In addition, digital foundation services may include computational engines that may perform various types of analysis, generate reports, simulate projections, and the like. The data infrastructure may enable users to analyze the data using data analysis tools. That is, the data analysis tools may be provided via the sustainability platform system 72 to access the data and use data analysis tools. Additional examples in which the sustainability platform 72, the digital foundation services, digital infrastructure, and other components of the embodiments described herein are included in FIG. 5.

By facilitating the interactions, integration, and exchange of data between the data providers 212 and the consumers 214, the sustainability platform system 72 may provide enhanced capabilities for processing data, generating action plans 90, and the like. Indeed, by employing the embodiments described herein, the sustainability platform system 72 provide infrastructure for data, compute, and technical architectures to be present and accessible. Further, the sustainability platform system 72 provides improved openness and extensibility to additional data providers 612, such as data sources, source types, and data/technology/services providers. The sustainability platform system 72 also allows for sustainability data discovery/measurement operations, data ingestion/transformation operations, data aggregation/ integration operations, and footprint calculations/computation operations to be performed via the platform.

In addition, the sustainability platform system 72 may provide sustainability reports, dashboards, and comparisons. Data Science and self-serve analytics may be accessed via the sustainability platform system 72. Moreover, sustainability/decarbonization planning (e.g., via domain workflows plug-ins) may be performed. In the same manner, the sustainability platform system 72 may enable scenarios/optimization/automation/orchestration tools to be implemented based on physics/AI/hybrid modeling/simulation of key processes.

As discussed above, the sustainability platform system 72 may develop and execute the action plans 90 with the ability to update the action plans 90 during execution. As such, the sustainability platform system 72 may execution monitoring/assessment/re-planning operations. In addition, the sustainability platform system 72 may monitor and track decarbonization Lifecycle Management (e.g., via digital twin), while providing sustainability provider marketplace for additional services (e.g., data, science/algorithms/PCFs, Offsets, etc.)

To perform the operations described herein, the sustainability platform system 72 may include a number of components to assist in processing, analyzing, collecting, and communicating data in accordance with the presently disclosed embodiments. With this in mind, FIG. 3 illustrates example components of the sustainability platform system 72. As shown in FIG. 3, the sustainability platform system 72 may include a communication component 252, a processor 254, a memory 256, a storage component 258, input/output (I/O) ports 260, a display 262, and the like. The communication component 252 may be a wireless or wired communication component that may facilitate communication between different monitoring systems, gateway communication devices, various control systems, and the like. The processor 254 may be any type of computer processor or microprocessor capable of executing computer-executable code. The memory 256 and the storage component 258 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 254 to perform the presently disclosed techniques. The memory 256 and the storage component 258 may also be used to store data received via the I/O ports 260, data analyzed by the processor 254, or the like.

The I/O ports 260 may be interfaces that couple to various types of I/O modules such as sensors, programmable logic controllers (PLC), and other types of equipment. For example, the I/O ports 260 may serve as an interface to pressure sensors, flow sensors, temperature sensors, and the like. As such, the sustainability platform system 72 may receive data associated with a well via the I/O ports 260. The I/O ports 260 may also serve as an interface to enable the sustainability platform system 72 to connect and communicate with surface instrumentation, servers, and the like.

The display 262 may include any type of electronic display such as a liquid crystal display, a light-emitting-diode display, and the like. As such, data acquired via the I/O ports and/or data analyzed by the processor 254 may be presented on the display 262, such that the sustainability platform system 72 may present designs for hydrocarbon sites 10 for view. In certain embodiments, the display 262 may be a touch screen display or any other type of display capable of receiving inputs from an operator. Although the sustainability platform system 72 is described as including the components presented in FIG. 3, the sustainability platform system 72 should not be limited to including the components listed in FIG. 3. Indeed, the sustainability platform system 72 may include additional or fewer components than described above.

Figure 7:
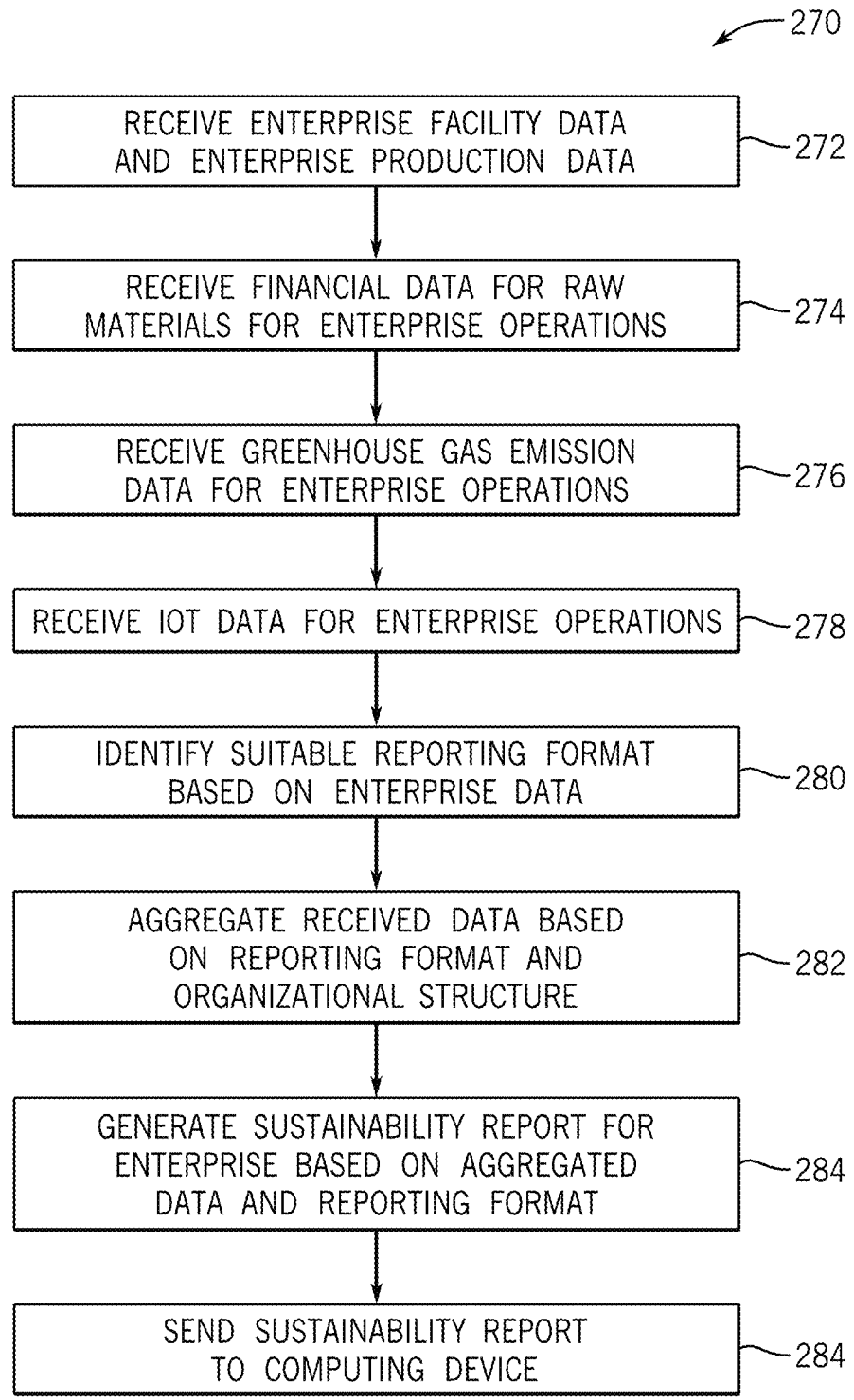
FIG. 7 is a flow chart of a method for generating sustainability reports for enterprise operations employing the sustainability platform system of FIG. 3, according to one or more embodiments of this disclosure.

With the foregoing in mind, FIG. 7 illustrates a method 270 for generating a sustainability report for enterprise operations in accordance with embodiments presented herein. Although the following description of the method 270 is described as being performed by the sustainability platform system 72 and in a particular order, it should be understood that any suitable computing system with access to the appropriate data sources and engineering workflow systems may perform the method 270 in any suitable order.

Referring now to FIG. 4, at block 272, the sustainability platform system 72 may receive enterprise facility data and enterprise production data. The enterprise facility data may include information regarding the structures owned, leased, or used by the enterprise. As such, the facility data may include information related to the building 56, such as the type of light bulbs employed it the building, the type of heating/venting and air conditioning (HVAC) systems employed at the building 56, the business hours of the building 56, irrigation schedules outside the building 56, and the like. In some embodiments, the facility data may be provided via the corporate data sources 110.

In some embodiments, the facility data may include operational schedules for various equipment within or outside the building 56. For instance, the operational schedules (e.g., when activated/deactivated) for the various equipment, such as the HVAC systems, irrigation systems (e.g., for landscape), plumbing systems, lighting equipment, and the like, may be provided along with communication information related to accessing control systems for controlling the equipment. As such, the sustainability platform system 72 may retrieve the current operational schedules directly from the respective control system and send commands to the respective control systems to modify the respective operations, operational schedules, or the like.

The enterprise facility data may also include invoice or financial information related to the costs or resource consumption of the buildings 56. For instance, the facility data may include energy costs, type of energy used, water consumption data, waste costs, and the like as gleaned from invoices provided to the enterprise. In addition, the enterprise facility data may include real time data from IoT devices 44 that may monitor resource consumption data such as watt-hours, water flow (e.g., via flow meters), waste weight (e.g., measured with a networked scale before waste removal services, waste compaction size), and the like.

In some embodiments, the facility data may include energy usage data including an amount of energy (e.g., electricity, gas, kilowatt hours) consumed within the building 56 over a period of time. In addition, the energy usage data may include measurements from energy sensors and other IoT devices that may be within the building 56, smart meters associated with the building 56, and the like. With this in mind, the energy usage data may provide information with regard to energy usage at various hierarchical levels, such as energy usage associated with a floor of the building 56, within a portion of the building 56, outside of the building 56, in common areas of the building 56, and the like. The energy usage data may provide information for the sustainability platform system 72 to use to determine real-time and expected sustainability parameters associated with employees being present at the building 56.

In some embodiments, the enterprise facility data may include operational schedules for employees such as days that the employee works in the office, days that the employees work from home, addresses of employees, types of transportation utilized by employees, and the like. In this way, the employee travel to the buildings may be accounted for in the sustainability parameters. Moreover, cost-benefit analysis with regard to evaluating sustainability parameters associated with employees working in the office 56 versus working from home may be determined by the sustainability platform system 72.

The enterprise production data may include information regarding processes and systems employed for manufacturing, processing, and producing products for the enterprise. In the hydrocarbon production system 10 example above, the enterprise production data may include information related to the equipment in each facility used to extract, transport, store, process, and distribute hydrocarbons. As such, the information may also include operational information with regard to the manner in which the equipment is operated or used, the arrangement of the equipment, the emissions of the equipment, and the like.

In some embodiments, the equipment may provide data in real time using IoT devices 44 or directly communicating with the sustainability platform system 72. The real time data may include temperature data, energy consumption data, water consumption data, waste production data, run time, operational schedules (e.g., times equipment is operating), and the like. In addition, the enterprise production data may include cost or invoice data for raw materials, energy, waste disposal, and the like.

By way of example, the enterprise production data may also be received via spot measurements acquired by optical gas imaging cameras, drone measurements, satellite measurements, and the like. In some embodiments, the datasets may be related to methane measurement based on flaring or venting. For instance, if there is a source of methane detected, the sustainability platform system 72 (e.g., via action plans 90) may take appropriate action to improve the combustion efficiency of the flare. In another example, if equipment is detected to be leaking, the sustainability platform system 72 may send notifications to computing devices of operators to notify them to fix the leakage It should be noted that the description of the enterprise facility data and the enterprise production data may include other data types not listed above. However, in general, the enterprise production data may provide data related to the sustainability parameters associated with performing core manufacturing or production processes. On the other hand, the enterprise facility data may correspond to data related to support services for performing business and engineering tasks associated with planning, preparing, and distributing products produced by the production operations of the enterprise.

At block 274, the sustainability platform system 72 may receive financial data for raw materials used for enterprise operations. The enterprise operations may include maintaining business and production operations related to the enterprise facility data and the enterprise production data. The raw materials may include energy consumption, water usage, waste services, and other sustainability parameters. The financial data may provide information regarding invoices, rates for energy consumption, and the like. In some embodiments, the financial data may also include costs related to sustainability equipment, such as carbon capture technology, used to improve sustainability parameters.

At block 276, the sustainability platform system 72 may receive greenhouse gas (GHG) emission data for the enterprise operations. The GHG emission data may be provided by or determined based on real time data acquired by real-time sources 108, the image acquisition sources 102, corporate sources 110, manual sources 112, and the like. In some embodiments, the marketplace sources 104 and the third-party sources 106 may provide information related to the GHG emission data. That is, these sources may model or generate expected GHG emission data for the enterprise operations based on simulations, monitored data, or the like.

At block 278, the sustainability platform system 72 may receive IoT data for the enterprise operations from any suitable IoT device 44. As such, the IoT data may represent real time data regarding current operational and consumption parameters for devices within a structure of the enterprise, equipment used within the enterprise, and the like. The IoT data may provide insight into equipment and facility devices that may be adjusted to improve sustainability parameters for the enterprise. Moreover, the IoT data may provide feedback data with regard to how implemented action plans 90 are affecting the sustainability parameters for the enterprise.

By way of example, the data collected at blocks 272-278 may include information regarding operations various equipment, operations, or the like. For instance, the data may be related to operations of an electro-submersible pump (ESP). Electro Submersible Pumps (ESPs) may consume a large portion of the energy used in well production operations. As a result, the GHG emissions associated with ESP operations may depend on the cleanliness/sustainability of the power source for the ESP. If powered by renewable energy, the ESPs' emission footprint can be minimized. However, reliance on fossil fuels for electricity can result in significant GHG (e.g., carbon) emissions, underscoring the importance of integrating ESPs with sustainable energy sources to mitigate environmental impact. With this in mind, in some embodiments, the sustainability platform system 72 may operational optimization schedules or parameters for variable speed drives (VSDs) that control the operations of the ESP to reduce the energy consumption of an ESP and move towards net-zero emissions. Indeed, by utilizing VSD to dynamically adjust pump operations based on detected conditions (e.g., pressure, flow, sustainability parameters, the ESPs may operate at certain capacities that significantly reduce energy use. Moreover, incorporating VSDs permits precise control over pump speed and torque, optimizing efficiency across varying conditions. Further, the controlled VSDs may decrease electricity demand but also extend equipment lifespan and reduce the environmental impact of oil and gas extraction operations.

The collected data may also be related to hydraulic fracturing operations. That is, in oil and gas operations, hydraulic fracturing operations may involve deploying trucks and other equipment at a site to perform the fracturing operations. The fuel consumed in association with performing these fracturing operations may contribute to a large part of the GHG emissions associated with the total project. Indeed, the fuel consumed by vehicles and other equipment is used extensively across various stages from exploration through production to distribution. As such, the sustainability platform system 72 may monitor the fuel consumed for the hydraulic operations at various stages, at various hierarchical levels (e.g., groups of equipment, vehicles), and the like. Using the fuel consumption data, the sustainability platform system 72 may identify the largest consumers of fuel and use this information for various modifications that may be proposed in accordance with embodiments herein.

Additionally, the collected data may include drilling operations that involve a drilling activity workflow. The drilling activity workflow may include planning of rig activities for proposing a drilling plan accounting for the well profile, well activities, emission forecasts, and the like. As such, the enterprise production data may also include the real-time monitoring of emissions from rig activities, such as power consumption by controllers (e.g., PLCs) and fuel consumption based on data from flow meters. In some embodiments, GHG sensors may be positioned at various locations.

At block 280, the sustainability platform system 72 may identify a suitable reporting format to generate a sustainability report associated with the enterprise operations. The sustainability reporting format may be associated with a geographical location of the equipment, facilities, and operations of the enterprise. As such, the enterprise data may provide indications with regard to the regions or countries in which various aspects of the enterprise operations are undertaken. Based on these locations, the sustainability platform system 72 may query the sustainability data base 94 or other suitable storage component to determine the reporting format used for the respective regions. That is, some regions or governmental agencies request reports regarding the sustainability parameters of the enterprise over the course of time. The reporting formats may include types of sustainability parameters to report, units in which the sustainability parameters are to be reported, a time period in which the sustainability parameters are to be reported, hierarchical levels in which to organize the sustainability parameters, an organizational structure to organize aggregated data, and the like. In addition, the sustainability platform system 72 may retrieve previously provided or produced reports 92 to determine the suitable reporting format. That is, the previously produced reports 92 may be scan and scraped to determine the sustainability parameters that are to be reported, along with other details with regard to the manner in which to report the sustainability parameters.

At block 282, the sustainability platform system 72 may aggregate or organize the data received at blocks 272, 274, 276, and 278 into appropriate data values in accordance with the reporting format determined at block 280. In some embodiments, the sustainability platform system 72 may also organize data with respect to different hierarchical levels of operations such as a facility level, a region level, a city level, a country level, and other geographically based levels. In addition, the sustainability platform system 72 may aggregate the data based on operations for facility operations and/or production operations. Further, the sustainability platform system 72 may aggregate or group the collected data into a variety of types of subsets of data, such that each subset of data may be packaged and sent to any of the engineering workflow systems 78 for analysis. Indeed, the engineering workflow systems 78 may request a particular type of data in a particular format or grouping, and the sustainability platform system 72 may subsequently package the relevant data accordingly and transmit it to the requesting engineering workflow system 78 for analysis. Moreover, the user input received via the manual source 112 may provide reporting format request in which the sustainability platform system 72 may organize the collected data. In some embodiments, the sustainability platform system 72 may organize the aggregated data according to an organizational structure that may distribute datasets in particular organizational levels or hierarchies to allow the enterprise to evaluate the respective aggregated datasets in various manners.

As such, the sustainability platform system 72 may aggregate or organize the collected data, such as the enterprise facility data and the enterprise production data, into various hierarchical levels to perform appropriate analysis within the respective hierarchies. The hierarchical levels may relate to physical levels, logical levels, or a hybrid of both depending on an associated organizational structure specified for the enterprise. That is, the collected data may be organized at a work unit level within a facility, a facility level to cover the operations within the facility, a city level to cover the operations performed by facilities in a city, and so on.

In some embodiments, prior to aggregating the collected data, the sustainability platform system 72 or other suitable personnel may perform data quality checks and validation operations to ensure that the aggregated data is accurate. The data quality check operations and validation operations may be performed in any suitable fashion.

Based on the aggregated data, at block 284, the sustainability platform system 72 generated the sustainability report for the enterprise data based on the aggregated data and the suitable reporting format. In some embodiments, the sustainability report may be a dynamic, interactive report that may include visualizations that may be selected by user input and may cause the respective computing device to provide additional information related to the selection. In this way, the sustainability report may provide layers of information related to the sustainability parameters of the enterprise that correspond to different modular views of the enterprise.

At block 286, the sustainability platform system 72 may send the sustainability report (e.g., report 92) to a suitable computing device. That is, the sustainability platform system 72 may send the sustainability report to a user's device associated with a user that requested the sustainability report. Additionally, the sustainability platform system 72 may send the sustainability report to a computing device, website, or database associated with an agency or organization that provided information regarding the reporting format.

After receiving sustainability report, the respective computing device may cause an application to open or be executed regardless as to whether the computing device is in a sleep or low power mode. That is, the reception of the sustainability report may cause the computing device to perform some other action to cause a notification related to the sustainability report being received to be generated. The notification may include a visual notification, an audible notification, a haptic notification, or the like.

By enabling the sustainability platform system 72 to aggregate and group the collected data into various formats and structures, the sustainability platform system 72 may be able to use more modular processes to determine methods for improving different types of sustainability parameters at various hierarchical levels. Indeed, the aggregated data may be provided in parallel to different engineering workflow systems 78 in parallel, such that different systems may analyze the respective datasets to determine action plans 90 more efficiently. Further, the sustainability platform system 72 may compare distinct solutions and recommendations provided by different engineering workflow systems 78 with respect to the respective sustainability parameter being addressed.

It should also be noted that by starting with the broad scope of information in the method 270, the sustainability platform system 72 may enable a user or machine learning algorithm gain insight into broad or larger scale sustainability parameters differences to help determine where improvements may be found. That is, if a certain region of the enterprise operations produces more desirable sustainability parameters as compared to another, the sustainability platform system 72 may then provide drilled down information related to the equipment or facility data to identify the operational differences that account for the improved sustainability parameters.

Figure 8:
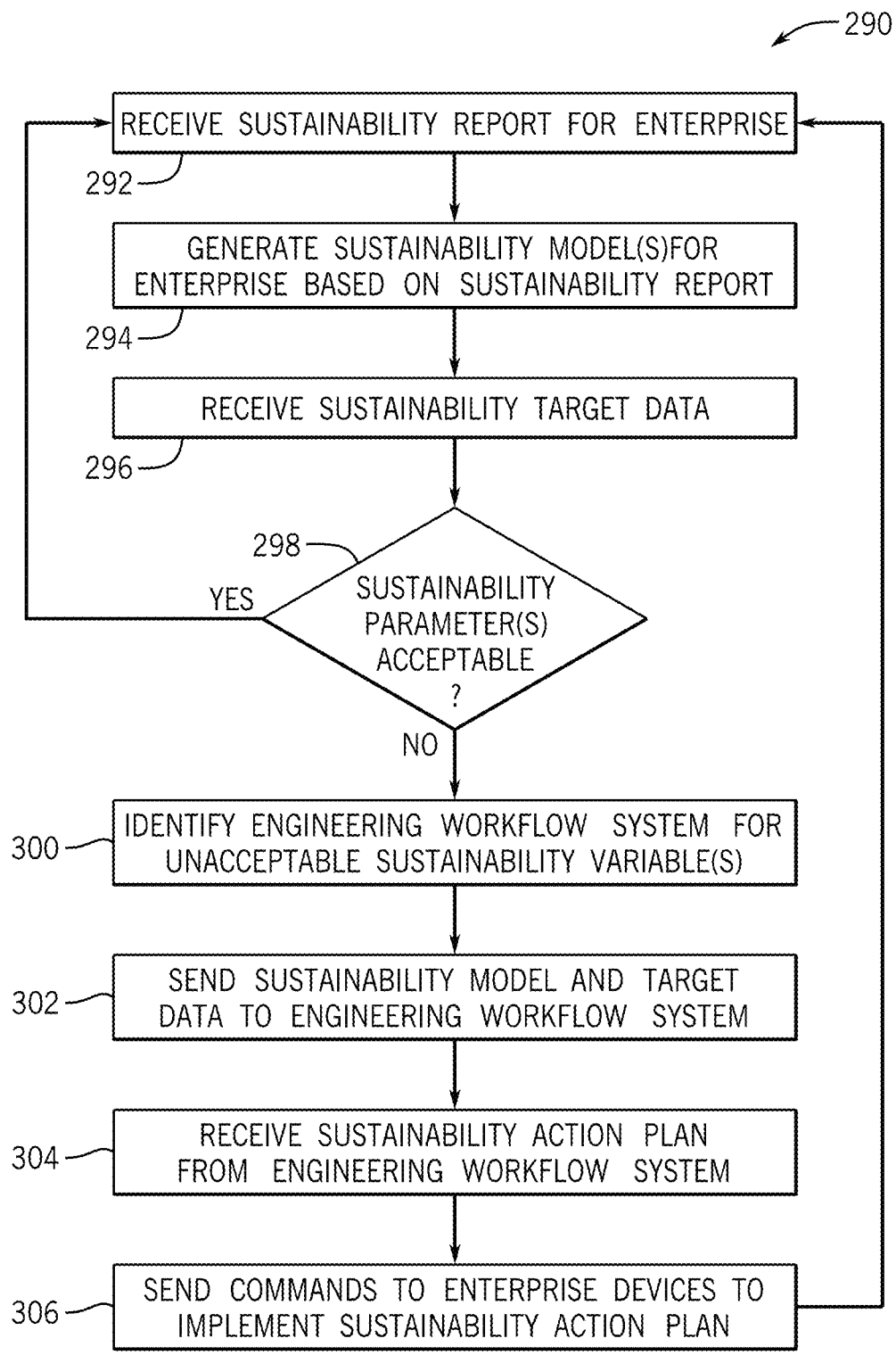
FIG. 8 is a flow chart of a method for generating sustainability action plans for enterprise operations employing the sustainability platform system of FIG. 3, according to one or more embodiments of this disclosure.

After generating the sustainability report, the sustainability platform system 72 may determine action plans 90 for improving one or more types of sustainability parameters. FIG. 8 illustrates a method 290 for generating a sustainability action plans for enterprise operations in accordance with embodiments presented herein. Although the following description of the method 290 is described as being performed by the sustainability platform system 72 and in a particular order, it should be understood that any suitable computing system with access to the appropriate data sources and engineering workflow systems may perform the method 290 in any suitable order.

Referring now to FIG. 8, at block 292, the sustainability platform system 72 may receive the sustainability report for the enterprise. The sustainability report may be generated as described above with respect to FIG. 7 or may be provided as a data file with the relevant information organized in ERP reports, spreadsheets, publications, or the like. It should be noted that the data included in the sustainability report may include economic data that may be provided by the strategic planning systems 142 as described above. As such, the sustainability report may include economic information related to cost functions for various sustainability variables and other parameters related to implementing action plans 90, evaluating data sources 74 or engineering workflow systems 78, or the like. As such, an economic analysis may be initiated before the action plans 90 are determined to consider forecasted business activities, technology costs, and other prioritized areas.

At block 294, the sustainability platform system 72 may generate one or more sustainability models for the enterprise based on the received sustainability report. The sustainability model may be a machine learning model that detects patterns, trends, correlations, and other similarities between different datasets. As such, the sustainability model may provide sustainability parameter changes over time for different types of sustainability parameters with respect to different variables. For instance, an aspect of the sustainability model may include tracking operational parameters of facility operations and/or production operations with respect to GHG emissions. The sustainability platform system 72 may generate a sustainability model for the enterprise with respect to each different type of sustainability parameter. In some embodiments, the sustainability platform system 72 may generate a particular sustainability model based on a request from one or more of the engineering workflow systems 78, based on user input, or the like.

The sustainability model may be a data model that defines structures, relationships, and constraints of the sustainability parameters with respect to the facilities, hierarchies, operations, or other components of the enterprise. Moreover, the initial sustainability model may include one or more currently implemented action plans (e.g., methods of operation of the enterprise). By way of example, the data model may be a conceptual data model, a logical data model, a physical data model, or the like. As should be appreciated, an organizational unit of an enterprise (e.g., delineated by region, business line, corporate entity, organizational or operational boundaries, facility, etc.) may be characterized by a single sustainability model. However, multiple action plans may be implemented, at one or more levels within a single organizational unit. Moreover, the organizational unit may be reevaluated to include different portions of the enterprise with corresponding action plans for the components thereof maintained at the desired component level. As more data is collected over time, the data model may be updated to include time references and may be used to generate a machine learning model for the sustainability parameters. Although in some embodiments the sustainability platform system 72 may not generate the sustainability model to perform the method 290, the generated sustainability model may enable the sustainability platform system 72 to perform various analysis and processing operations in a more computationally efficient manner as compared to using the sustainability report.

At block 296, the sustainability platform system 72 may receive sustainability target data. The sustainability target data may include GHG emission limits, water usage limits, waste production limits, and other measurable sustainability parameter limits or ranges. In some embodiments, the sustainability target data may be determined by querying governmental regulations provided by the corporate data sources 110, accessible online, or the like. In addition, a user may define the sustainability target data via manual input. Further, the sustainability target data may include generic provisions to continually identify improvements in sustainability parameters. Moreover, the sustainability platform system 72 may determine sustainability target data based on achievements or goals detected in other enterprises similar to the respective enterprise.

In yet another embodiment, the sustainability platform system 72 may determine sustainability target data based on machine learning models that identify achievable sustainability target goals for enterprises that have similar equipment, enterprise operations, facility operations, or the like. That is, the machine learning models may receive similar datasets as described above associated with a collection of enterprises and compare the sustainability parameters for each of the enterprises relative to the respective enterprise associated with the sustainability platform system 72. Based on the models, the sustainability platform system 72 may identify sustainability parameters achieved by other enterprises yet unachieved by the respective enterprise. These identified sustainability parameters may be employed by the sustainability platform system 72 as the sustainability target data. In addition, the sustainability platform system 72 may determine that the average sustainability parameter for the related enterprises may be suitable as the target sustainability data.

In some embodiments, the target sustainability data may be an aggregated sustainability parameter associated with the enterprise operations, the facility operations, or both. As such, the enterprise, as a whole, may be evaluated with respect to the target sustainability data. In some embodiments, the target sustainability data may include economic constraints, technology constraints, or both to bound the solutions identified by the sustainability platform system 72.

At block 298, the sustainability platform system 72 may determine whether the sustainability parameters for the enterprise as indicated in the sustainability report or generated sustainability model are acceptable in view of the sustainability target data. If the sustainability parameters are acceptable, the sustainability platform system 72 may return to block 292 and continue monitoring for updated sustainability reports.

If, however, the sustainability parameters are not acceptable, the sustainability platform system 72 may proceed to block 300 and identify an engineering workflow system to address the unacceptable sustainability parameters. That is, as mentioned above, each of the engineering workflow systems 78 may provide action plans or recommendations to address particular sustainability parameters, particular aspects or operations of the enterprise, or the like. As such, the sustainability platform system 72 may determine whether one of the engineering workflow systems 78 is suited to address the unacceptable sustainability parameters. In some embodiments, each of the engineering workflow systems 78 may identify sustainability parameters that are associated with its respective analysis. The sustainability platform system 72 may then identify the one or more engineering workflow systems 78 that may be suitable to improve respective sustainability parameters. In some embodiments, the sustainability platform system 72 may broadcast the request for improved sustainability parameters to each of the engineering workflow systems 78, which may then determine whether the respective analysis performed by the respective system may provide any support to achieve the sustainability target data. It should be noted that the broadcast may also be provided to the strategic level planning systems 142 to assess economic analysis context for action plans 90, solutions provided by the engineering workflow systems 78, or other related tasks that may be implemented for improving sustainability parameters.

In some embodiments, the engineering workflow system 78 may be related to a number of abatement technologies associated with reducing GHG emissions, water usage, waste accumulation, and the like. By way of example, the engineering workflow system 78 may include access to a database or catalog of abatement technologies, which may be scraped from a network (e.g., Internet), internal databases, or the like. For instance, technologies related to energy industries may be found in various web-provided catalogues. The abatement technologies may be focused on performing certain operations, such as avoiding routing flaring, performing flare maintenance, avoiding use of light oils to dilute extra heavy oils to transport them to deep conversion refineries, replacing leaky equipment, employing best operating practices, conducting routine leak detection and repair (LDAR), employing renewable energy to generate heat, steam, and electricity, capturing and sequestering carbon when producing and refining high carbon assets, using green hydrogen in hydro-conversion refinery, employing high-efficiency pumps than run on renewable energy, monitoring and repairing for corrosion in legacy assets, and the like. It should be noted that the engineering workflow systems 78 may account for technology parameters for each of these abatement technologies may be associated with its own set of abatement technologies parameters, such as emissions reduction maximal capacity, construction/decommissioning time, lifetime cost Capex/Opex, geographical applicability, and the like.

With the foregoing in mind, each engineering workflow system 78 may be associated with one or more abatement technologies. In addition, each abatement technology may be associated with one or more sustainability parameters. That is, the sustainability platform system 72 may identify engineering workflow systems 78 to query or access based on the association between the desired sustainability parameters and the respective abatement technologies. That is, if the sustainability parameters are not acceptable at block 298, the sustainability platform system 72 may query a lookup table or database for abatement technologies associated with the respective sustainability parameters. After identifying the relevant abatement technologies, the sustainability platform system 72 may query the engineering workflow systems 78 to identify the suitable engineering workflow systems 78 that may be associated with the relevant abatement technologies. In some embodiments, a large language model or artificial intelligence system may develop the associations between the abatement technologies and the engineering workflow systems 78 based on descriptions of the engineering workflow systems 78, as published on a network location or the like.

Referring back to FIG. 8, after identifying suitable engineering workflow systems 78, the sustainability platform system 72 may, at block 302, send the sustainability model and the sustainability target data to the identified engineering workflow system(s) 78. In some embodiments, the sustainability platform system 72 may send portions of the sustainability model, as opposed to the entire sustainability model, to accommodate the analysis operations performed by the respective engineering workflow system 78. In this way, the sustainability platform system 72 may reduce the amount of data that is transmitted across a network to improve network latency. Further, the engineering workflow system 78 that receives the modified sustainability model may efficiently process the received data without analyzing or reviewing data that may be irrelevant to its operations. Further, it should be noted that the sustainability platform system 72 may send multiple sustainability models or portions thereof to multiple engineering workflow systems 78 in parallel. As such, the various engineering workflow system 78 may perform their respective analysis operations in parallel, thereby improving the efficiency in which the sustainability platform system 72 may receive recommendations.

After receiving the sustainability model (or equivalent datasets), the respective engineering workflow system 78 may compare the data present in the sustainability model to other datasets that it tracked, stored, or modeled. The respective engineering workflow system 78 may then identify solutions or action plans that other enterprises have implemented or determine unique solutions for the enterprise based on its core functions. For example, the engineering workflow system 78 may receive information related to the operational schedule of the facility operations and/or production operations, model modifications to these operations over time, and determine suitable operational modifications that may assist the enterprise in achieving respective sustainability target data.

By way of example, the action plans provided by the engineering workflow systems 78 may provide operational recommendations to reduce GHG emissions for the facility operations, the production operations, or both. That is, the action plan may include recommendations with regard to operating field devices in the production operations differently to reduce carbon emissions. Further, a recommendation may include providing a carbon capture device at a facility to reduce carbon emissions and provide a location or entity to receive the captured carbon for reinjection operations. In addition, the recommendations may include reducing the amount of emissions flared when it is determined that some emissions can be directed to the capture technology to achieve the sustainability goals.

In some embodiments, the action plans may include recommendations that may provide an initial improvement in sustainability parameters, such as recommendations to change lights in facilities to light emitting diode technology, which consumes less energy compared to other light sources. However, after making this change, the effect on sustainability parameters to achieve net zero goals are limited because the gain is achieved immediately. As such, the action plans may project different operations and technologies to use over time to continue to enable the enterprise to achieve improved sustainability parameters.

In addition, the action plans 90 may include modifying the operational schedule of devices (e.g., lights, HVAC) within the building 56. That is, half of the available lights may be powered during day hours to provide limited, less energy intensive, amounts of light. Further, the operating conditions of the building 56 may be dynamically altered to rely on occupancy data. That is, the operational schedule for the building 56 may have set hours for devices to operate, but the operational schedule may be modified based on the occupancy data (e.g., heat sensors, light sensors) indicating that persons are not present at the building 56, a portion of the building 56, and the like. In other words, the action plan 90 may include modifying the operational schedule of utilities of the building 56 from a static (e.g., user defined) format to a dynamic (e.g., occupancy sensor based) scheme.

At block 304, the sustainability platform system 72 may receive the recommendations or generated action plans from the respective engineering workflow systems 78. In some embodiments, the recommendations or action plans may include operational changes (e.g., equipment operation schedule change to operate at certain times when renewable sources of energy are available) for devices in the facility operations, the production operations, or both. In addition, the recommendations or action plans may include equipment changes that may involve replacing equipment with more efficient equipment, adding equipment that may not be previously present (e.g., carbon capture), identifying business partners to purchase carbon credits or exchange services, and the like.

At block 306, the sustainability platform system 72 may send commands to devices within the enterprise to implement the action plan 90. As such, IoT devices 44 may adjust respective operations of other devices to implement the recommended actions provided in the action plan 90. In some embodiments, the action plans provided by the various engineering workflow systems 78 may be evaluated by the sustainability platform system 72 to determine whether each of them can be implemented with one another. Further, the action plans may be evaluated with respect to budgetary constraints and other constraints. The sustainability platform system 72 may select a combination of the provided action plans to use to generate commands based on the combination that suits the interests and constraints of the enterprise. These decisions may be made based on an optimization algorithm perform by the sustainability platform system 72, user input received by the sustainability platform system 72, or the like.

In some embodiments, the action plans 90 may be stored in the sustainability database 94 for analysis or retrieval at another time. In this way, the sustainability platform system 72 may evaluate action plans 90 prior to sending the sustainability model to engineering workflow systems 78 to identify recommendations more efficiently if the respective action plans 90 are applicable.

Figure 9:
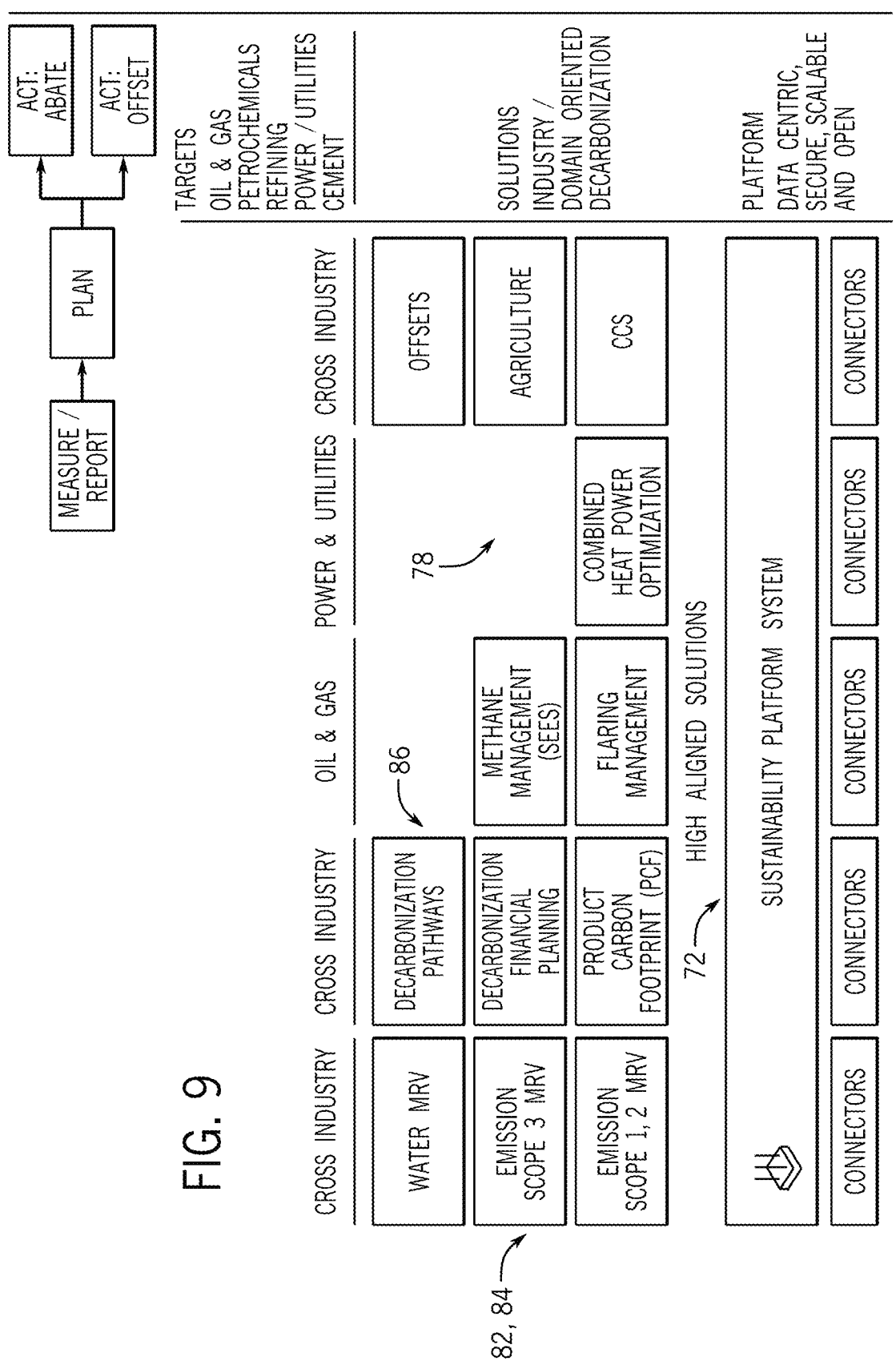
FIG. 9 is a block diagram of various measurement data sources, planning data sources, and workflow data sources that may be provided to a sustainability platform system, according to one or more embodiments of this disclosure.

Keeping the foregoing in mind, FIG. 9 illustrates a workflow system in which the sustainability platform system 72 may coordinate with engineering workflow systems 78 as described above. That is, the sustainability platform system 72 may receive the sustainability parameters via the measurement block 82 and verification block 84. As shown, the sustainability platform system 72 may receive water data, waste data, and emission data in different scopes or hierarchical levels. The sustainability platform system may coordinate with the engineering workflow systems 78 such as a methane management system, a flaring management system, a combined heat and power optimization system, a carbon capture system (CCS), and an agriculture system as shown. Based on the result provided by the engineering workflow systems 78, the sustainability platform system 72 may evaluate the provided action plans with different planning modules or systems to perform different respective analysis operations via the planning block 86. For instance, the sustainability platform system 72 may determine decarbonization pathways, decarbonization financial planning, and product carbon footprints based on the received action plans, measurement data, or both. The decarbonization pathways may indicate one or more operational or business changes (e.g., work from home policies) to improve carbon emissions across the enterprise. The decarbonization financial planning (e.g., via the strategic level planning systems 142) may account for the costs associated with implementing the various action plans. The product carbon footprint may provide an indication of the expected carbon footprint associated with producing the product. As mentioned above, the product carbon footprint may capture a total amount of carbon emissions associated with the production of various products to the end of the lifecycle of the product. In this way, the decarbonization pathways that may be part of the action plans 90 may provide multiple scenarios of carbon emission reduction plans to meet emission goals for the enterprise while continuing to support business activities. Although FIG. 9 provides example modules or systems in which the planning block 86 may use to generate different outputs, it should be understood that the modules presented herein are merely examples and the present embodiments should not be limited to these examples.

Figure 10:
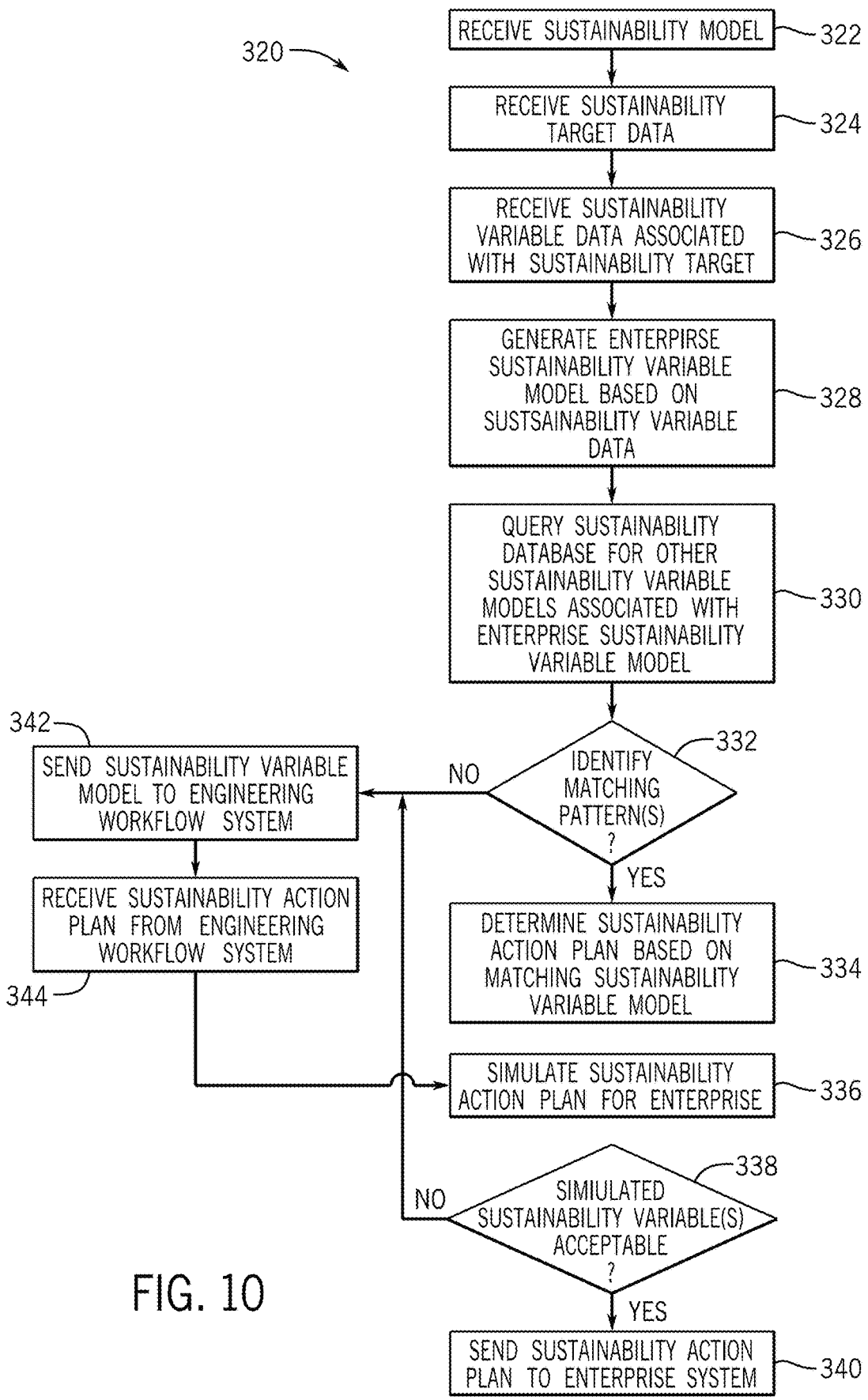
FIG. 10 illustrates a method which the sustainability platform system may simulate sustainability action plans over a period of time for analysis, in accordance with embodiments herein.

Keeping the foregoing in mind, FIG. 10 illustrates a method 320 which the sustainability platform system 72 may simulate sustainability action plans 90 over a period of time for analysis, in accordance with embodiments herein. Although the following description of the method 320 is described as being performed by the sustainability platform system 72 and in a particular order, it should be understood that any suitable computing system with access to the appropriate data sources and engineering workflow systems may perform the method 320 in any suitable order. As such, it should be noted that the embodiments described below may be performed via the planning block 86 or via a respective engineering workflow system 78.

Referring now to FIG. 10, at blocks 322 and 324, the sustainability platform system 72 may receive the sustainability model and the sustainability target data as described above with reference to FIG. 8. At block 326, the sustainability platform system 72 may receive sustainability variable data associated with the sustainability target data. That is, the sustainability variable data may refer to one or more sustainability parameters that make up part of the sustainability target data or a variable in which the sustainability platform system 72 is requested to optimize. As such, the sustainability target data may include a set of sustainability parameters that are used by the sustainability platform system 72 to achieve. For instance, the sustainability target data may include energy, emissions, water, and waste objectives. However, a user may select to optimize for the emissions portion of the sustainability target data. The emissions may be the sustainability variable data received at block 326.

In some embodiments, the sustainability platform system 72 may receive multiple sustainability variable datasets for optimization and may identify multiple engineering workflow systems 78 to coordinate with to determine action plans 90. By evaluating each sustainability variable data in isolation, the sustainability platform system 72 may identify solutions in parallel and present action plans 90 that optimize for different sustainability variables to provide a user more context to make a selection of the generated action plans 90.

At block 328, the sustainability platform system 72 may generate an enterprise sustainability variable model based on the sustainability variable data and the sustainability model received at block 322. That is, the sustainability platform system 72 may isolate a portion of the sustainability model that captures correlations and patterns related to the sustainability variable. In this way, the enterprise sustainability variable model may include a subset of data to allow the respective analysis component to efficiently process the respective subset of data, as opposed to filtering through datasets that may not be relevant for its analysis.

At block 330, the sustainability platform system 72 may query the sustainability database 94 to determine whether other sustainability variable models stored in the sustainability database 94 have matching patterns. That is, the sustainability platform system 72 may compare the sustainability variable datasets across multiple sustainability variable models and identify any matching sustainability variable datasets. The matching datasets may correspond to a period of time or correspond to an improvement in the sustainability variable datasets. As such, if the sustainability platform system 72 identifies matching datasets, the matching sustainability variable model may provide insights into action plans that may be implemented by the respective enterprise to improve the sustainability variable parameters.

With this in mind, at block 332, the sustainability platform system 72 may determine whether matching patterns or datasets have been identified. The matching datasets may correspond to certain measurement values within some threshold (e.g., +/−10%), desired trends in the sustainability variable data (e.g., decrease in GHG emissions over time), or any other characteristic that may provide insight into improving a respective sustainability variable parameter. If the sustainability platform system 72 identifies a matching pattern or desired effect, the sustainability platform system 72 may proceed to block 334 and determine a suitable sustainability action plan based on the matching sustainability variable model. The matching sustainability variable model may be associated with an enterprise of the same industry type, a different industry type, a same regional location, a different location, or the like.

That is, the sustainability platform system 72 may retrieve the matching sustainability variable model and determine the action plans 90 implemented by the respective enterprise to achieve the results illustrated in the matching variable model. In some embodiments, the matching sustainability variable model may include a list of operational commands, operational schedules, types of equipment used, and other information that may be associated with the sustainability variable parameter. It should be noted that the matching sustainability variable model may also include multiple models that corresponds to different portions of the hydrocarbon production system 10 or any suitable enterprise. As such, by way of example, one matching sustainability variable model may be related to enterprise operations, while another matching sustainability variable model may be related to facility operations. In addition, some matching sustainability variable models may represent both enterprise and facility operations. In this way, the sustainability platform system 72 may determine adjustments to enterprise operations, facility operations, or both to achieve the target sustainability data.

Based on the sustainability action plans associated with the matching sustainability variable model, the sustainability platform system 72 may, at block 336, simulate implementing the sustainability action plan over a period of time (e.g., months, years, decades) for the enterprise. That is, the sustainability platform system 72 may apply machine learning algorithms to predict the effects of implementing the sustainability action plans 90 over a course of time for the enterprise. The simulations may include capital expenditure data related to the costs for implementing the plan over time, the sustainability variable parameter effects over time, and the like. In this way, users may realize the benefits of implementing the action plan 90 over the life of the facility operations, the production operations, or both.

At block 338, the sustainability platform system 72 may determine whether the simulated sustainability variable data achieves the sustainability target goals indicated in the sustainability target data. If the sustainability target goals are achieved, the sustainability platform system 72 may proceed to block 340 and send the sustainability action plan 90 to the computing device associated with the enterprise for implementation or evaluation in accordance with embodiments described above. However, if the simulated sustainability variables do not achieve the sustainability target goals, the sustainability platform system 72 may proceed to block 342.

At block 342, the sustainability platform system 72 may send the sustainability variable model to an appropriate engineering workflow system 78 or to multiple engineering workflow system 78. That is, one or more of the engineering workflow systems 78 may affect the same sustainability variable parameter. As such, the engineering workflow systems 78 may analyze the received sustainability variable model and perform similar operations described in blocks 332 and 334. Further, the engineering workflow systems 78 may determine operational changes or equipment changes to improve the respective sustainability variable data. It should be noted that in various embodiments described herein, validation analysis may be undertaken by individuals or teams designated to confirm the findings of the sustainability platform system 72.

Figure 11:
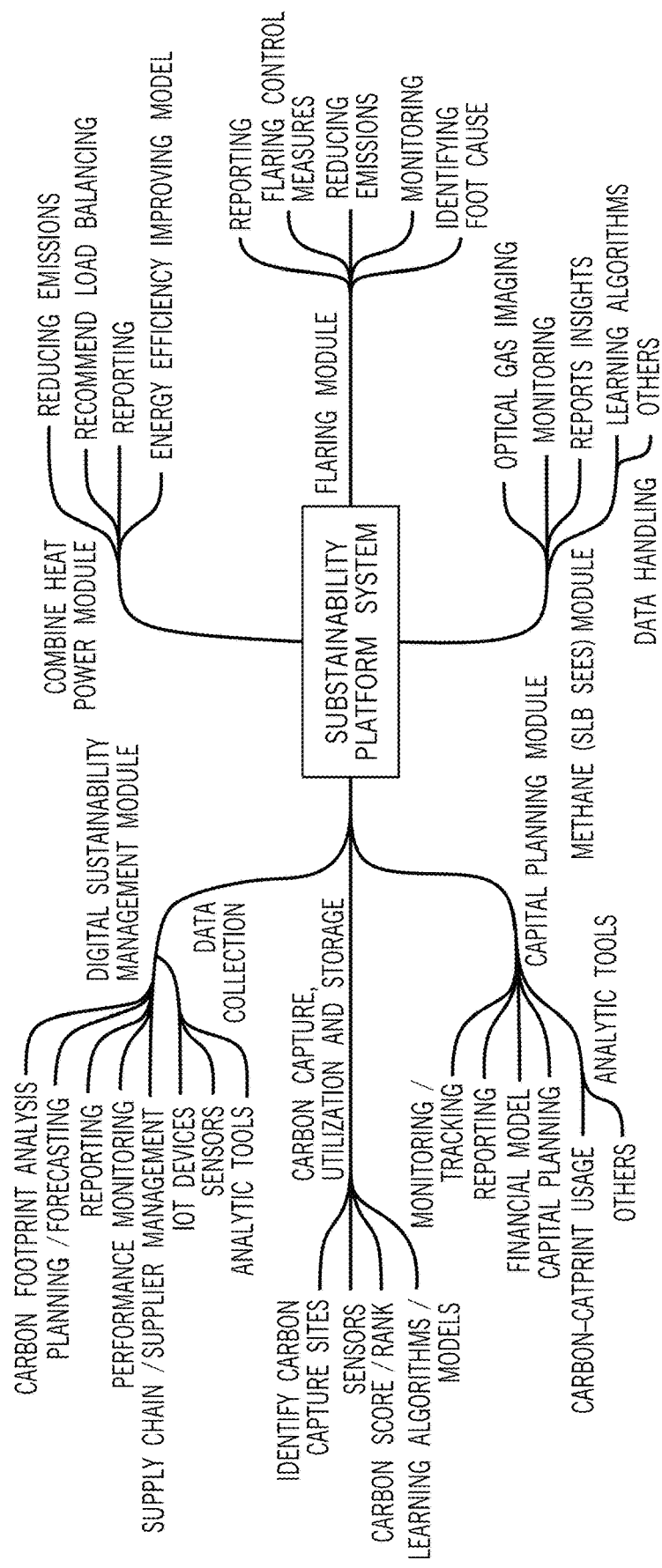
FIG. 11 illustrates a data diagram of various types of data that may be analyzed for determining plans and workflows to improve sustainability parameters for the enterprise operations, according to one or more embodiments of this disclosure.

By way of example, FIG. 11 illustrates various engineering workflow systems 78 or modules that may work with the sustainability platform system 72 to determine action plans 90 to optimize for different sustainability variables. The sustainability platform system 72 may identify suitable engineering workflow systems 78 based on the expected outputs provided by those respective systems. Although FIG. 11 focuses on carbon-oriented workflows and variables, it should be understood that in other embodiments the sustainability platform system 72 may coordinate activities with modules that focus on water, waste, energy, and other suitable sustainability parameters.

At block 346, the sustainability platform system 72 may receive the generated sustainability action plans 90 from the engineering workflow systems 78. The sustainability platform system 72 may then proceed to block 336 to simulate the effects of the action plans 90 with respect to the enterprise and continue the method 320.

Reference throughout this specification to "one embodiment," "an embodiment," "embodiments," "some embodiments," "certain embodiments," or similar language means that a particular feature, structure, or characteristic described in connection with the embodiment may be included in at least one embodiment of this disclosure. Thus, these phrases or similar language throughout this specification may, but do not necessarily, all refer to the same embodiment. Although this disclosure has been described with respect to specific details, it is not intended that such details should be regarded as limitations on the scope of this disclosure, except to the extent that they are included in the accompanying claims.

Additionally, the methods and processes described above may be performed by a processor. Moreover, the term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing[a function] . . . " or "step for [perform]ing[a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    receiving, via a computing system, production data and facility data associated with an enterprise, wherein the production data comprises information related to one or more operational tasks performed with regard to extracting hydrocarbons from a subsurface region of the earth as part of a hydrocarbon production system, and wherein the facility data comprises additional information related to one or more utility operations within one or more buildings associated with the enterprise;
    receiving, via the computing system, sustainability parameter data associated with one or more operations corresponding to the enterprise based on the production data and the facility data, wherein the one or more operations corresponds to the one or more operational tasks and the one or more utility operations;
    receiving, via the computing system, sustainability target data corresponding to one or more target values associated with the sustainability parameter data;
    generating, via the computing system, a sustainability report representative of one or more sustainability parameters associated with the operations of the enterprise based on the sustainability parameter data;
    identifying, via the computing system, one or more engineering workflow systems of a plurality of engineering workflow systems in response to one or more differences between the one or more target values and one or more current values of the sustainability parameter data being greater than one or more thresholds, wherein each of the plurality of engineering workflow systems corresponds to a separate computing device relative to the computing system, and wherein the one or more engineering workflow systems are identified by:
        broadcasting a request indicative of the sustainability parameter data to the plurality of engineering workflow systems;
        querying a database comprising a list of abatement technologies associated with each of the plurality of engineering workflow systems, wherein each abatement technology of the list corresponds to performing an operation to modify at least one of the one or more current values; and
        receiving one or more responses from the one or more engineering workflow systems, wherein the one or more engineering workflow systems are configured to provide the one or more responses based on an association between a respective abatement technology of each of the one or more engineering workflow systems and the sustainability parameter data;
    sending, via the computing system, the sustainability report and the sustainability target data to the one or more engineering workflow systems configured to determine one or more action plans associated with improving the one or more sustainability parameters;
    receiving, via the computing system, the one or more action plans from the one or more engineering workflow systems; and
    automatically sending, via the computing system, one or more commands to a plurality of devices associated with adjusting the one or more operational tasks performed with regard to extracting the hydrocarbons from the subsurface region as part of the hydrocarbon production system, adjusting the one or more utility operations within the one or more buildings, or both, based on the one or more action plans in response to receiving the one or more action plans, wherein the one or more commands are configured to cause the plurality of devices associated with the one or more operational tasks to adjust one or more respective operations to control a flow of hydrocarbons from the subsurface region in response to receiving the one or more commands.

2. The method of claim 1, wherein the one or more utility operations comprise one or more operational schedules for one or more lighting systems, one or more irrigation systems, one or more heating/venting and air conditioning (HVAC) systems, one or more plumbing systems, or any combination thereof.

3. The method of claim 1, wherein the facility data comprises energy costs data, type of energy resource data, water consumption data, waste cost data, or any combination thereof.

4. The method of claim 1, wherein the facility data is acquired from one or more internet-of-things (IoT) devices.

5. The method of claim 1, wherein the facility data comprises one or more operational schedules of a plurality of employees that visit the one or more buildings.

6. The method of claim 1, wherein the information related to the one or more operational tasks performed in the hydrocarbon production system comprises one or more types of equipment, an arrangement of the equipment, emission data associated with the equipment, or any combination thereof.

7. The method of claim 1, comprising:
generating a sustainability model representative of the one or more sustainability parameters associated with the operations of the enterprise over a period of time based on the sustainability report;
determining that the one or more sustainability parameters are less than one or more additional thresholds;
identifying the one or more engineering workflow systems in response to the one or more sustainability parameters being less than the additional one or more thresholds; and
sending one or more requests to provide the one or more action plans to the one or more engineering workflow systems.

8. The method of claim 7, wherein the one or more action plans comprise one or more modifications to the one or more operational tasks and the utility operations.

9. A system, comprising:
a production system configured to produce a plurality of products over time as part of an enterprise;
a plurality of buildings associated with the enterprise; and
a processing system comprising a memory configured to store instructions that cause the processing system to perform operations comprising:
receiving production data and facility data associated with the enterprise, wherein the production data comprises information related to one or more operational tasks performed in the production system, and wherein the facility data comprises additional information related to one or more utility operations within the plurality of buildings associated with the enterprise;
receiving sustainability parameter data associated with one or more operations corresponding to the enterprise based on the production data and the facility data, wherein the one or more operations corresponds to the one or more operational tasks and the one or more utility operations;
receiving sustainability target data corresponding to one or more target values associated with the sustainability parameter data;
generating a sustainability model representative of one or more sustainability parameters associated with the operations of the enterprise based on the sustainability parameter data;
identifying one or more engineering workflow systems of a plurality of engineering workflow systems in response to one or more differences between the one or more target values and one or more current values of the sustainability parameter data being greater than one or more thresholds, wherein each of the plurality of engineering workflow systems corresponds to a computing device, and wherein the one or more engineering workflow systems are identified by:
broadcasting a request indicative of the sustainability parameter data to the plurality of engineering workflow systems;
querying a database comprising a list of abatement technologies associated with each of the plurality of engineering workflow systems, wherein each abatement technology of the list corresponds to performing an operation to modify the one or more current values; and
receiving one or more responses from the one or more engineering workflow systems, wherein the one or more engineering workflow systems are configured to provide the one or more responses based on an association between a respective abatement technology of each of the one or more engineering workflow systems and the sustainability parameters;
sending the sustainability target data to the one or more engineering workflow systems configured to determine one or more action plans associated with improving the one or more sustainability parameters based on the sustainability model;
receiving the one or more action plans from the one or more engineering workflow systems; and
automatically sending one or more commands to a plurality of devices associated with controlling one or more operational parameters of the one or more operational tasks within the production system, adjusting the one or more utility operations within the plurality of buildings, or both, based on the one or more action plans in response to receiving the one or more action plans, wherein the one or more commands are configured to cause the plurality of devices associated with the one or more operational tasks to adjust the one or more operational parameters to control production of the plurality of products in response to receiving the one or more commands.

10. The system of claim 9, wherein the one or more commands correspond to adjusting one or more operational schedules for one or more lighting systems, one or more irrigation systems, one or more heating/venting and air conditioning (HVAC) systems, one or more plumbing systems, or any combination thereof of the plurality of buildings.

11. The system of claim 9, wherein the facility data comprises energy costs data, type of energy resource data, water consumption data, waste cost data, or any combination thereof, and wherein the one or more commands correspond to modifying one or more operational schedules associated with equipment operated in the production system.

12. The system of claim 11, wherein the equipment comprises an electro-submersible pump, a variable speed drive, or both.

13. The system of claim 9, wherein the production system corresponds to hydraulic fracturing operations.

14. The system of claim 13, wherein the one or more sustainability parameters corresponds to greenhouse gas emissions associated with a plurality of trucks being used in the hydraulic fracturing operations.

15. The system of claim 9, comprising:
   determining that the one or more sustainability parameters are less than one or more additional thresholds based on the sustainability model; and
   identifying the one or more engineering workflow systems in response to the one or more sustainability parameters being less than the one or more additional thresholds.

16. The system of claim 9, wherein the one or more action plans comprise one or more modifications to the one or more operational tasks and the utility operations.

17. A non-transitory computer-readable medium comprising computer-executable instructions configured to cause a computing system to perform operations comprising:
   receiving production data and facility data associated with an enterprise, wherein the production data comprises information related to one or more operational tasks performed in a production system, and wherein the facility data comprises additional information related to one or more utility operations within a plurality of buildings associated with the enterprise;
   receiving sustainability parameter data associated with one or more operations corresponding to the enterprise based on the production data and the facility data, wherein the one or more operations corresponds to the one or more operational tasks and the one or more utility operations;
   receiving sustainability target data corresponding to one or more target values associated with the sustainability parameter data;
   generating a sustainability model representative of one or more sustainability parameters associated with the operations of the enterprise based on the sustainability parameter data;
   identifying one or more engineering workflow systems of a plurality of engineering workflow systems in response to one or more differences between the one or more target values and one or more current values of the sustainability parameter data being greater than one or more thresholds, wherein each of the plurality of engineering workflow systems corresponds to a separate computing device relative to the computing system, and wherein the one or more engineering workflow systems are identified by:
      broadcasting a request indicative of the sustainability parameter data to the plurality of engineering workflow systems;
      querying a database comprising a list of abatement technologies associated with each of the plurality of engineering workflow systems, wherein each abatement technology of the list corresponds to performing an operation to modify the one or more current values; and
      receiving one or more responses from the one or more engineering workflow systems, wherein the one or more engineering workflow systems are configured to provide the one or more responses based on an association between a respective abatement technology of each of the one or more engineering workflow systems and the one or more differences;
   sending the sustainability target data to the one or more engineering workflow systems configured to determine one or more action plans associated with improving the one or more sustainability parameters based on the sustainability model;
   receiving the one or more action plans from the one or more engineering workflow systems; and
   automatically sending one or more commands to a plurality of devices associated with controlling one or more operational parameters of the one or more operational tasks within the production system, adjusting the one or more utility operations within the plurality of buildings, or both, based on the one or more action plans in response to receiving the one or more action plans, wherein the one or more commands are configured to cause the plurality of devices associated with the one or more operational tasks to adjust the one or more operational parameters in response to receiving the one or more commands.

18. The non-transitory computer-readable medium of claim 17, wherein the one or more commands correspond to:
   adjusting one or more operational schedules for one or more lighting systems, one or more irrigation systems, one or more heating/venting and air conditioning (HVAC) systems, one or more plumbing systems, or any combination thereof of the plurality of buildings; and
   modifying one or more additional operational schedules associated with equipment operated in the production system.

19. The non-transitory computer-readable medium of claim 18, wherein the production data comprises sensor data acquired via one or more greenhouse gas sensors.

20. The non-transitory computer-readable medium of claim 17, comprising:
   determining that the one or more sustainability parameters are less than one or more additional thresholds based on the sustainability model; and
   identifying the one or more engineering workflow systems in response to the one or more sustainability parameters being less than the one or more additional thresholds.

* * * * *